US012676938B2

(12) United States Patent
Gill et al.

(10) Patent No.: US 12,676,938 B2
(45) Date of Patent: Jul. 7, 2026

(54) METHODS AND ARRANGEMENTS FOR SELF-SERVICE PRINTING VIA AUTHENTICATION BASED ON A CONTACTLESS CARD

(71) Applicant: Capital One Services, LLC, McLean, VA (US)

(72) Inventors: Renee Gill, New York, NY (US); Joshua Edwards, Carrollton, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/195,550

(22) Filed: May 10, 2023

(65) Prior Publication Data

US 2024/0380857 A1 Nov. 14, 2024

(51) Int. Cl.
| | |
|---|---|
| *G06F 3/12* | (2006.01) |
| *H04N 1/00* | (2006.01) |
| *H04N 1/44* | (2006.01) |
| G06F 21/31 | (2013.01) |

(52) U.S. Cl.
CPC ......... *H04N 1/4426* (2013.01); *G06F 3/1222* (2013.01); *G06F 3/1238* (2013.01); *G06F 3/126* (2013.01); *G06F 3/1288* (2013.01); *H04N 1/00244* (2013.01); *G06F 21/31* (2013.01)

(58) Field of Classification Search
None
See application file for complete search history.

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

The International Search Report and Written Opinion mailed Jun. 6, 2024, in corresponding PCT/US2024/027214 (nine (9) pages).

(Continued)

*Primary Examiner* — Haris Sabah
(74) *Attorney, Agent, or Firm* — KDW Firm PLLC

(57) ABSTRACT

A computer-implemented method to enable self-service printing with authentication includes receiving, by a server, a print-request to print a document associated with an account, the print-request received from a computing device. The method further includes adding, by the server, a print job for the document in a print queue associated with the account. The method further includes receiving, by the server, a second request to initiate printing the document associated with the account, the second request received from a printer. The method further includes releasing, by the server, the print queue associated with the account to cause the printer to print the document, the releasing being responsive to the second request being authenticated.

20 Claims, 15 Drawing Sheets

(56)                 References Cited

U.S. PATENT DOCUMENTS 5,533,126  A     7/1996   Hazard
5,537,314  A     7/1996   Kanter
5,590,038  A    12/1996   Pitroda
5,592,553  A     1/1997   Guski et al.
5,616,901  A     4/1997   Crandall
5,666,415  A     9/1997   Kaufman
5,763,373  A     6/1998   Robinson et al.
5,764,789  A     6/1998   Pare, Jr. et al.
5,768,373  A     6/1998   Lohstroh et al.
5,778,072  A     7/1998   Samar
5,796,827  A     8/1998   Coppersmith et al.
5,832,090  A    11/1998   Raspotnik
5,883,810  A     3/1999   Franklin et al.
5,901,874  A     5/1999   Deters
5,929,413  A     7/1999   Gardner
5,960,411  A     9/1999   Hartman et al.
6,021,203  A     2/2000   Douceur et al.
6,049,328  A     4/2000   Vanderheiden
6,058,373  A     5/2000   Blinn et al.
6,061,666  A     5/2000   Do et al.
6,105,013  A     8/2000   Curry et al.
6,199,114  B1    3/2001   White et al.
6,199,762  B1    3/2001   Hohle
6,216,227  B1    4/2001   Goldstein et al.
6,227,447  B1    5/2001   Campisano
6,282,522  B1    8/2001   Davis et al.
6,324,271  B1   11/2001   Sawyer et al.
6,342,844  B1    1/2002   Rozin
6,367,011  B1    4/2002   Lee et al.
6,402,028  B1    6/2002   Graham, Jr. et al.
6,438,550  B1    8/2002   Doyle et al.
6,501,847  B2   12/2002   Helot et al.
6,572,015  B1    6/2003   Norton
6,631,197  B1   10/2003   Taenzer
6,641,050  B2   11/2003   Kelley et al.
6,655,585  B2   12/2003   Shinn
6,662,020  B1   12/2003   Aaro et al.
6,721,706  B1    4/2004   Strubbe et al.
6,731,778  B1    5/2004   Oda et al.
6,779,115  B1    8/2004   Naim
6,792,533  B2    9/2004   Jablon
6,829,711  B1   12/2004   Kwok et al.
6,834,271  B1   12/2004   Hodgson et al.
6,834,795  B1   12/2004   Rasmussen et al.
6,852,031  B1    2/2005   Rowe
6,865,547  B1    3/2005   Brake, Jr. et al.
6,873,260  B2    3/2005   Lancos et al.
6,877,656  B1    4/2005   Jaros et al.
6,889,198  B2    5/2005   Kawan
6,905,411  B2    6/2005   Nguyen et al.
6,910,627  B1    6/2005   Simpson-Young et al.
6,971,031  B2   11/2005   Haala
6,990,588  B1    1/2006   Yasukura
7,006,986  B1    2/2006   Sines et al.
7,085,931  B1    8/2006   Smith et al.
7,127,605  B1   10/2006   Montgomery et al.
7,128,274  B2   10/2006   Kelley et al.
7,140,550  B2   11/2006   Ramachandran
7,152,045  B2   12/2006   Hoffman
7,165,727  B2    1/2007   de Jong
7,175,076  B1    2/2007   Block et al.
7,202,773  B1    4/2007   Oba et al.
7,206,806  B2    4/2007   Pineau
7,232,073  B1    6/2007   de Jong
7,246,752  B2    7/2007   Brown
7,252,242  B2    8/2007   Ho
7,254,569  B2    8/2007   Goodman et al.
7,263,507  B1    8/2007   Brake, Jr. et al.
7,270,276  B2    9/2007   Vayssiere
7,278,025  B2   10/2007   Saito et al.
7,287,692  B1   10/2007   Patel et al.
7,290,709  B2   11/2007   Tsai et al.
7,306,143  B2   12/2007   Bonneau, Jr. et al.
7,319,986  B2    1/2008   Praisner et al.
7,325,132  B2    1/2008   Takayama et al.

7,373,515  B2    5/2008   Owen et al.
7,374,099  B2    5/2008   de Jong
7,375,616  B2    5/2008   Rowse et al.
7,380,710  B2    6/2008   Brown
7,424,977  B2    9/2008   Smets et al.
7,453,439  B1   11/2008   Kushler et al.
7,472,829  B2    1/2009   Brown
7,487,357  B2    2/2009   Smith et al.
7,527,208  B2    5/2009   Hammad
7,568,631  B2    8/2009   Gibbs et al.
7,584,153  B2    9/2009   Brown et al.
7,597,250  B2   10/2009   Finn
7,628,322  B2   12/2009   Holtmanns et al.
7,652,578  B2    1/2010   Braun et al.
7,689,832  B2    3/2010   Talmor et al.
7,703,142  B1    4/2010   Wilson et al.
7,748,609  B2    7/2010   Sachdeva et al.
7,748,617  B2    7/2010   Gray
7,748,636  B2    7/2010   Finn
7,762,457  B2    7/2010   Bonalle et al.
7,789,302  B2    9/2010   Tame
7,793,851  B2    9/2010   Mullen
7,796,013  B2    9/2010   Murakami et al.
7,801,799  B1    9/2010   Brake, Jr. et al.
7,801,829  B2    9/2010   Gray et al.
7,805,755  B2    9/2010   Brown et al.
7,809,643  B2   10/2010   Phillips et al.
7,827,115  B2   11/2010   Weller et al.
7,828,214  B2   11/2010   Narendra et al.
7,848,746  B2   12/2010   Juels
7,882,553  B2    2/2011   Tuliani
7,900,048  B2    3/2011   Andersson
7,908,216  B1    3/2011   Davis et al.
7,922,082  B2    4/2011   Muscato
7,933,589  B1    4/2011   Mamdani et al.
7,949,559  B2    5/2011   Freiberg
7,954,716  B2    6/2011   Narendra et al.
7,954,723  B2    6/2011   Charrat
7,962,369  B2    6/2011   Rosenberg
7,993,197  B2    8/2011   Kaminkow
8,005,426  B2    8/2011   Huomo et al.
8,010,405  B1    8/2011   Bortolin et al.
RE42,762   E     9/2011   Shin et al.
8,041,954  B2   10/2011   Plesman
8,060,012  B2   11/2011   Sklovsky et al.
8,074,877  B2   12/2011   Mullen et al.
8,082,450  B2   12/2011   Frey et al.
8,095,113  B2    1/2012   Kean et al.
8,099,332  B2    1/2012   Lemay et al.
8,103,249  B2    1/2012   Markison
8,108,687  B2    1/2012   Ellis et al.
8,127,143  B2    2/2012   Abdallah et al.
8,135,648  B2    3/2012   Oram et al.
8,140,010  B2    3/2012   Symons et al.
8,141,136  B2    3/2012   Lee et al.
8,150,321  B2    4/2012   Winter et al.
8,150,767  B2    4/2012   Wankmueller
8,186,602  B2    5/2012   Itay et al.
8,196,131  B1    6/2012   von Behren et al.
8,215,563  B2    7/2012   Levy et al.
8,224,753  B2    7/2012   Atef et al.
8,232,879  B2    7/2012   Davis
8,233,841  B2    7/2012   Griffin et al.
8,245,292  B2    8/2012   Buer
8,249,654  B1    8/2012   Zhu
8,266,451  B2    9/2012   Leydier et al.
8,276,814  B2   10/2012   Davis
8,285,329  B1   10/2012   Zhu
8,302,872  B2   11/2012   Mullen
8,312,519  B1   11/2012   Bailey et al.
8,316,237  B1   11/2012   Felsher et al.
8,332,272  B2   12/2012   Fisher
8,346,670  B2    1/2013   Hasson
8,365,988  B1    2/2013   Medina, III et al.
8,369,960  B2    2/2013   Tran et al.
8,371,501  B1    2/2013   Hopkins
8,381,307  B2    2/2013   Cimino
8,391,719  B2    3/2013   Alameh et al.
8,417,231  B2    4/2013   Sanding et al.

(56) References Cited

U.S. PATENT DOCUMENTS

| | | | |
|---|---|---|---|
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B2 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,314,877 B2 * | 4/2022 | Laing .................... G06F 3/1292 |
| 11,334,872 B2 | 5/2022 | Phillips |
| 11,361,173 B2 | 6/2022 | Edwards |
| 11,392,933 B2 | 7/2022 | Mossler |

(56) References Cited

U.S. PATENT DOCUMENTS

| | | | |
|---|---|---|---|
| 11,392,935 B2 | 7/2022 | Suresh | |
| 11,416,844 B1 | 8/2022 | Osterkamp | |
| 11,423,392 B1 | 8/2022 | Ho | |
| 11,443,292 B2 | 9/2022 | Sherif | |
| 11,444,770 B2 | 9/2022 | Wieker | |
| 11,461,764 B2 | 10/2022 | Rule | |
| 11,481,764 B2 | 10/2022 | Shakkarwar | |
| 11,521,213 B2 | 12/2022 | Rule | |
| 11,551,200 B1 | 1/2023 | Cook | |
| 11,556,918 B2 | 1/2023 | Mestre | |
| 11,615,395 B2 | 3/2023 | McHugh | |
| 11,777,933 B2 | 10/2023 | Moreton | |
| 2001/0010723 A1 | 8/2001 | Pinkas | |
| 2001/0029485 A1 | 10/2001 | Brody et al. | |
| 2001/0034702 A1 | 10/2001 | Mockett et al. | |
| 2001/0054003 A1 | 12/2001 | Chien et al. | |
| 2002/0078345 A1 | 6/2002 | Sandhu et al. | |
| 2002/0093530 A1 | 7/2002 | Krothapalli et al. | |
| 2002/0100808 A1 | 8/2002 | Norwood et al. | |
| 2002/0120583 A1 | 8/2002 | Keresman, III et al. | |
| 2002/0152116 A1 | 10/2002 | Yan et al. | |
| 2002/0153424 A1 | 10/2002 | Li | |
| 2002/0165827 A1 | 11/2002 | Gien et al. | |
| 2003/0023554 A1 | 1/2003 | Yap et al. | |
| 2003/0034873 A1 | 2/2003 | Chase et al. | |
| 2003/0055727 A1 | 3/2003 | Walker et al. | |
| 2003/0078882 A1 | 4/2003 | Sukeda et al. | |
| 2003/0167350 A1 | 9/2003 | Davis et al. | |
| 2003/0208449 A1 | 11/2003 | Diao | |
| 2003/0220876 A1 | 11/2003 | Burger | |
| 2004/0015958 A1 | 1/2004 | Veil et al. | |
| 2004/0039919 A1 | 2/2004 | Takayama et al. | |
| 2004/0127256 A1 | 7/2004 | Goldthwaite et al. | |
| 2004/0215674 A1 | 10/2004 | Odinak et al. | |
| 2004/0230799 A1 | 11/2004 | Davis | |
| 2005/0044367 A1 | 2/2005 | Gasparini et al. | |
| 2005/0075985 A1 | 4/2005 | Cartmell | |
| 2005/0081038 A1 | 4/2005 | Arditti Modiano et al. | |
| 2005/0138387 A1 | 6/2005 | Lam et al. | |
| 2005/0156026 A1 | 7/2005 | Ghosh et al. | |
| 2005/0160049 A1 | 7/2005 | Lundholm | |
| 2005/0195975 A1 | 9/2005 | Kawakita | |
| 2005/0228997 A1 | 10/2005 | Bicker | |
| 2005/0247797 A1 | 11/2005 | Ramachandran | |
| 2005/0269402 A1 | 12/2005 | Spitzer | |
| 2006/0006230 A1 | 1/2006 | Bear et al. | |
| 2006/0040726 A1 | 2/2006 | Szrek et al. | |
| 2006/0041402 A1 | 2/2006 | Baker | |
| 2006/0044153 A1 | 3/2006 | Dawidowsky | |
| 2006/0047954 A1 | 3/2006 | Sachdeva et al. | |
| 2006/0085848 A1 | 4/2006 | Aissi et al. | |
| 2006/0136334 A1 | 6/2006 | Atkinson et al. | |
| 2006/0173985 A1 | 8/2006 | Moore | |
| 2006/0174331 A1 | 8/2006 | Schuetz | |
| 2006/0242698 A1 | 10/2006 | Inskeep et al. | |
| 2006/0250644 A1* | 11/2006 | Yamauchi | H04N 1/00233 |
| | | | 358/1.15 |
| 2006/0280338 A1 | 12/2006 | Rabb | |
| 2007/0033642 A1 | 2/2007 | Ganesan et al. | |
| 2007/0055630 A1 | 3/2007 | Gauthier et al. | |
| 2007/0061266 A1 | 3/2007 | Moore et al. | |
| 2007/0061487 A1 | 3/2007 | Moore et al. | |
| 2007/0116292 A1 | 5/2007 | Kurita et al. | |
| 2007/0118745 A1 | 5/2007 | Buer | |
| 2007/0197261 A1 | 8/2007 | Humbel | |
| 2007/0224969 A1 | 9/2007 | Rao | |
| 2007/0241182 A1 | 10/2007 | Buer | |
| 2007/0256134 A1 | 11/2007 | Lehtonen et al. | |
| 2007/0258594 A1 | 11/2007 | Sandhu et al. | |
| 2007/0276765 A1 | 11/2007 | Hazel | |
| 2007/0278291 A1 | 12/2007 | Rans et al. | |
| 2008/0008315 A1 | 1/2008 | Fontana et al. | |
| 2008/0011831 A1 | 1/2008 | Bonalle et al. | |
| 2008/0014867 A1 | 1/2008 | Finn | |
| 2008/0035738 A1 | 2/2008 | Mullen | |
| 2008/0071681 A1 | 3/2008 | Khalid | |
| 2008/0072303 A1 | 3/2008 | Syed | |
| 2008/0082452 A1 | 4/2008 | Wankmueller | |
| 2008/0086767 A1 | 4/2008 | Kulkarni et al. | |
| 2008/0099552 A1 | 5/2008 | Grillion | |
| 2008/0103968 A1 | 5/2008 | Bies et al. | |
| 2008/0109309 A1 | 5/2008 | Landau et al. | |
| 2008/0110983 A1 | 5/2008 | Ashfield | |
| 2008/0120711 A1 | 5/2008 | Dispensa | |
| 2008/0156873 A1 | 7/2008 | Wilhelm et al. | |
| 2008/0162312 A1 | 7/2008 | Sklovsky et al. | |
| 2008/0164308 A1 | 7/2008 | Aaron et al. | |
| 2008/0207307 A1 | 8/2008 | Cunningham, II et al. | |
| 2008/0209543 A1 | 8/2008 | Aaron | |
| 2008/0223918 A1 | 9/2008 | Williams et al. | |
| 2008/0285746 A1 | 11/2008 | Landrock et al. | |
| 2008/0308641 A1 | 12/2008 | Finn | |
| 2009/0037275 A1 | 2/2009 | Pollio | |
| 2009/0048026 A1 | 2/2009 | French | |
| 2009/0132417 A1 | 5/2009 | Scipioni et al. | |
| 2009/0143104 A1 | 6/2009 | Loh et al. | |
| 2009/0171682 A1 | 7/2009 | Dixon et al. | |
| 2009/0174894 A1* | 7/2009 | Kamijo | H04N 1/444 |
| | | | 358/1.15 |
| 2009/0210308 A1 | 8/2009 | Toomer et al. | |
| 2009/0235339 A1 | 9/2009 | Mennes et al. | |
| 2009/0249077 A1 | 10/2009 | Gargaro et al. | |
| 2009/0282264 A1 | 11/2009 | Ameil et al. | |
| 2010/0023449 A1 | 1/2010 | Skowronek et al. | |
| 2010/0023455 A1 | 1/2010 | Dispensa et al. | |
| 2010/0029202 A1 | 2/2010 | Jolivet et al. | |
| 2010/0033310 A1 | 2/2010 | Narendra et al. | |
| 2010/0036769 A1 | 2/2010 | Winters et al. | |
| 2010/0078471 A1 | 4/2010 | Lin et al. | |
| 2010/0082491 A1 | 4/2010 | Rosenblatt et al. | |
| 2010/0094754 A1 | 4/2010 | Bertran et al. | |
| 2010/0095130 A1 | 4/2010 | Bertran et al. | |
| 2010/0100480 A1 | 4/2010 | Altman et al. | |
| 2010/0114731 A1 | 5/2010 | Kingston et al. | |
| 2010/0192230 A1 | 7/2010 | Steeves et al. | |
| 2010/0207742 A1 | 8/2010 | Buhot et al. | |
| 2010/0211797 A1 | 8/2010 | Westerveld et al. | |
| 2010/0240413 A1 | 9/2010 | He et al. | |
| 2010/0257357 A1 | 10/2010 | McClain | |
| 2010/0312634 A1 | 12/2010 | Cervenka | |
| 2010/0312635 A1 | 12/2010 | Cervenka | |
| 2011/0013224 A1* | 1/2011 | Uchida | H04N 1/444 |
| | | | 358/1.15 |
| 2011/0028160 A1 | 2/2011 | Roeding et al. | |
| 2011/0035604 A1 | 2/2011 | Habraken | |
| 2011/0060631 A1 | 3/2011 | Grossman et al. | |
| 2011/0068170 A1 | 3/2011 | Lehman | |
| 2011/0084132 A1 | 4/2011 | Tofighbakhsh | |
| 2011/0101093 A1 | 5/2011 | Ehrensvard | |
| 2011/0113245 A1 | 5/2011 | Varadarajan | |
| 2011/0125638 A1 | 5/2011 | Davis et al. | |
| 2011/0131415 A1 | 6/2011 | Schneider | |
| 2011/0153437 A1 | 6/2011 | Archer et al. | |
| 2011/0153496 A1 | 6/2011 | Royyuru | |
| 2011/0155801 A1 | 6/2011 | Rowberry | |
| 2011/0208658 A1 | 8/2011 | Makhotin | |
| 2011/0208965 A1 | 8/2011 | Machani | |
| 2011/0211219 A1 | 9/2011 | Bradley et al. | |
| 2011/0218911 A1 | 9/2011 | Spodak | |
| 2011/0238564 A1 | 9/2011 | Lim et al. | |
| 2011/0246780 A1 | 10/2011 | Yeap et al. | |
| 2011/0258452 A1 | 10/2011 | Coulier et al. | |
| 2011/0280406 A1 | 11/2011 | Ma et al. | |
| 2011/0282785 A1 | 11/2011 | Chin | |
| 2011/0294418 A1 | 12/2011 | Chen | |
| 2011/0312271 A1 | 12/2011 | Ma et al. | |
| 2012/0024947 A1 | 2/2012 | Naelon | |
| 2012/0030047 A1 | 2/2012 | Fuentes et al. | |
| 2012/0030121 A1 | 2/2012 | Grellier | |
| 2012/0047071 A1 | 2/2012 | Mullen et al. | |
| 2012/0079281 A1 | 3/2012 | Lowenstein et al. | |
| 2012/0109735 A1 | 5/2012 | Krawczewicz et al. | |
| 2012/0109764 A1 | 5/2012 | Martin et al. | |
| 2012/0143703 A1 | 6/2012 | Wall | |

(56) References Cited

U.S. PATENT DOCUMENTS

| | | |
|---|---|---|
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek et al. |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0339561 A1* | 11/2015 | Takenaka ............. G06F 3/1238 358/1.14 |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0070642 A1* | 3/2017 | Miyamoto ............ G06F 3/1226 |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |

(56)                    References Cited

U.S. PATENT DOCUMENTS

| | | | |
|---|---|---|---|
| 2017/0180134 A1 | 6/2017 | King | |
| 2017/0230189 A1 | 8/2017 | Toll et al. | |
| 2017/0237301 A1 | 8/2017 | Elad et al. | |
| 2017/0289127 A1 | 10/2017 | Hendrick | |
| 2017/0295013 A1 | 10/2017 | Claes | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0039987 A1 | 2/2018 | Molino | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0172055 A1 | 6/2019 | Hale | |
| 2019/0238517 A1 | 8/2019 | D'Agostino et al. | |
| 2019/0303554 A1* | 10/2019 | Yamashita | H04L 63/083 |
| 2019/0303945 A1 | 10/2019 | Mitra | |
| 2020/0183628 A1* | 6/2020 | Boo | G06F 3/1238 |
| 2021/0004806 A1 | 1/2021 | Noe | |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0300225 A1* | 9/2022 | Oshima | G06F 3/1286 |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | | |
|---|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| KR | 20150140132 A | 12/2015 |
| WO | 9910824 A1 | 3/1999 |
| WO | 0049586 A1 | 8/2000 |
| WO | 2006070189 A2 | 7/2006 |

| | | | |
|---|---|---|---|
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017047855 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25,

(56)       References Cited

OTHER PUBLICATIONS

2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail—Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

Author Unknown, "Global expansion of card tapping mobile OTP for security and convenience is imminent," Jun. 28, 2022, website: https://www.swidch.com/blogs/card-tapping-motp-blog.

Emvco: "EMV Card Personalisation Specification", Aug. 1, 2021, pp. 1-114, Retrieved from the Internet: URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

* cited by examiner

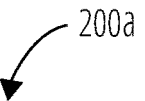
COMPUTING DEVICE 104
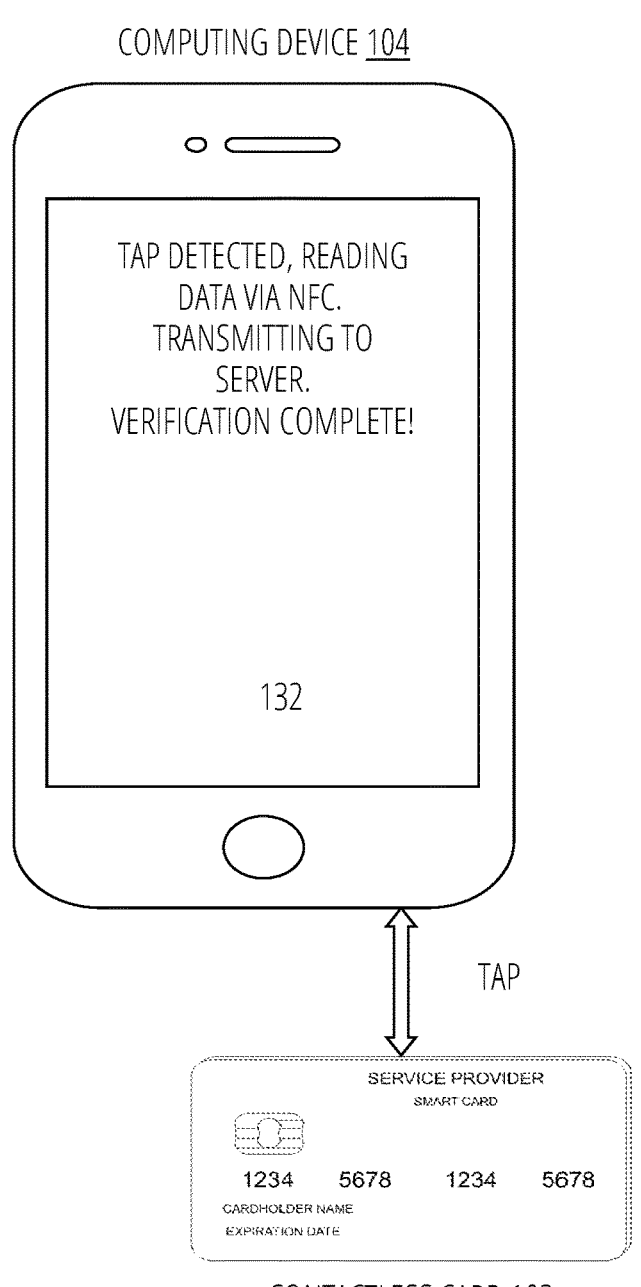
TAP DETECTED, READING
DATA VIA NFC.
TRANSMITTING TO
SERVER.
VERIFICATION COMPLETE!
132
TAP
SERVICE PROVIDER
SMART CARD
1234    5678    1234    5678
CARDHOLDER NAME
EXPIRATION DATE
CONTACTLESS CARD 102
FIG. 2A

200b
COMPUTING DEVICE 104
HERE IS YOUR OTP:
ABCDEFG....12334
SCAN CODE:
202
132
FIG. 2B

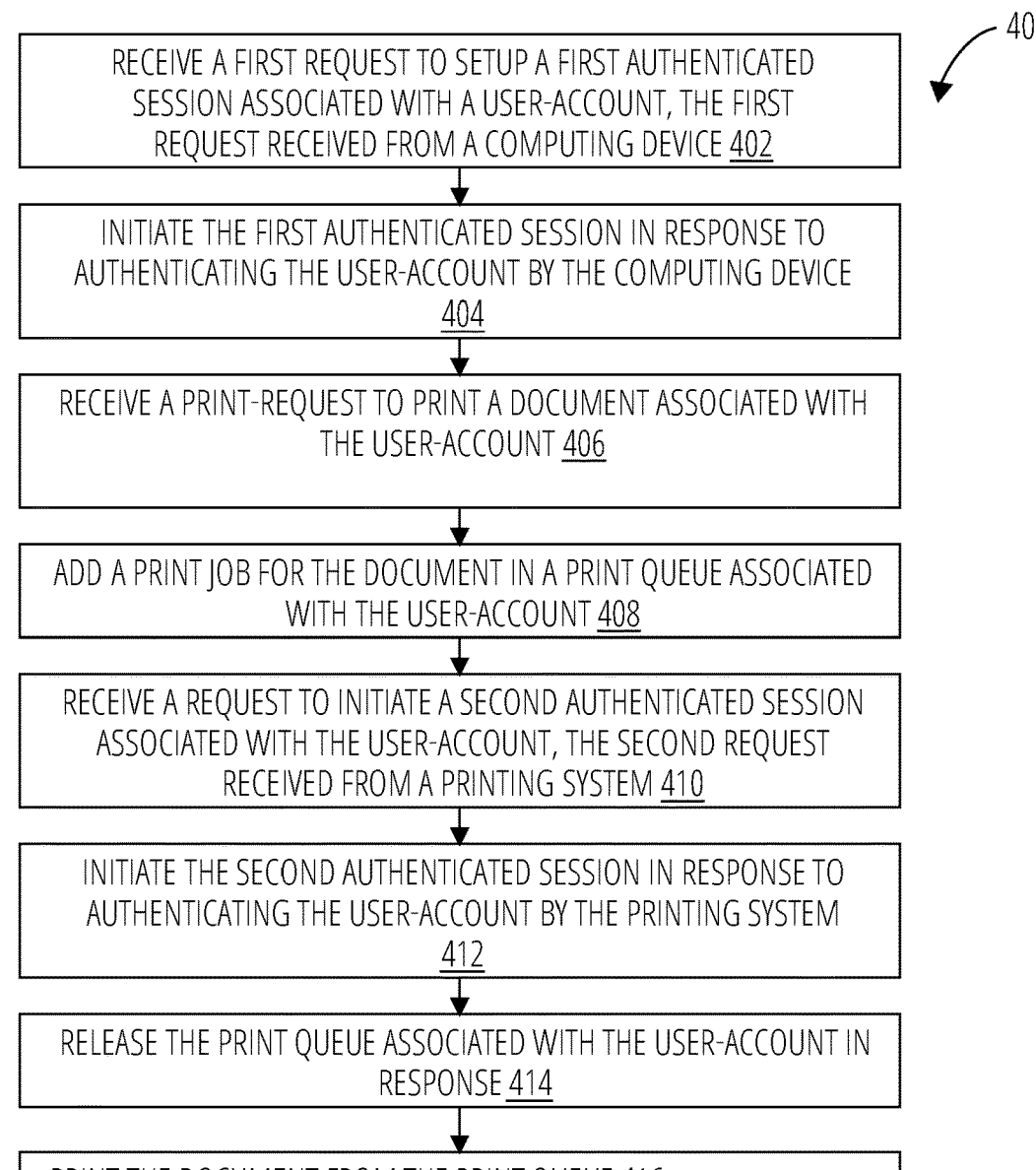

RECEIVE A FIRST REQUEST TO SETUP A FIRST AUTHENTICATED SESSION ASSOCIATED WITH A USER-ACCOUNT, THE FIRST REQUEST RECEIVED FROM A COMPUTING DEVICE 402

INITIATE THE FIRST AUTHENTICATED SESSION IN RESPONSE TO AUTHENTICATING THE USER-ACCOUNT BY THE COMPUTING DEVICE 404

RECEIVE A PRINT-REQUEST TO PRINT A DOCUMENT ASSOCIATED WITH THE USER-ACCOUNT 406

ADD A PRINT JOB FOR THE DOCUMENT IN A PRINT QUEUE ASSOCIATED WITH THE USER-ACCOUNT 408

RECEIVE A REQUEST TO INITIATE A SECOND AUTHENTICATED SESSION ASSOCIATED WITH THE USER-ACCOUNT, THE SECOND REQUEST RECEIVED FROM A PRINTING SYSTEM 410

INITIATE THE SECOND AUTHENTICATED SESSION IN RESPONSE TO AUTHENTICATING THE USER-ACCOUNT BY THE PRINTING SYSTEM 412

RELEASE THE PRINT QUEUE ASSOCIATED WITH THE USER-ACCOUNT IN RESPONSE 414

PRINT THE DOCUMENT FROM THE PRINT QUEUE 416

FIG. 4

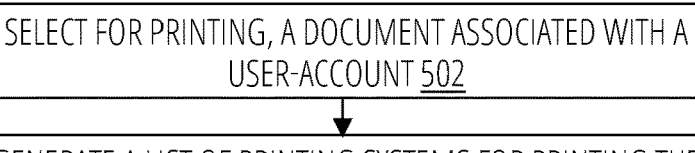

500

```
┌─────────────────────────────────────────────────┐
│   SELECT FOR PRINTING, A DOCUMENT ASSOCIATED     │
│   WITH A USER-ACCOUNT 502                        │
└─────────────────────────────────────────────────┘
                        ↓
┌─────────────────────────────────────────────────┐
│   GENERATE A LIST OF PRINTING SYSTEMS FOR        │
│   PRINTING THE DOCUMENT, THE LIST IS GENERATED   │
│   BASED ON THE TYPE OF THE DOCUMENT 504          │
└─────────────────────────────────────────────────┘
                        ↓
┌─────────────────────────────────────────────────┐
│   SELECT FROM THE LIST, A PRINTING SYSTEM TO     │
│   PRINT THE DOCUMENT 506                         │
└─────────────────────────────────────────────────┘
                        ↓
┌─────────────────────────────────────────────────┐
│   PROVIDE AN AUTHENTICATION CODE IN RESPONSE     │
│   TO THE PRINTING SYSTEM BEING ACCESSED TO       │
│   PRINT THE DOCUMENT 508                         │
└─────────────────────────────────────────────────┘
                        ↓
┌─────────────────────────────────────────────────┐
│   RECEIVE AND PRINT THE DOCUMENT, IN RESPONSE    │
│   TO RECEIVING THE AUTHENTICATION CODE FROM THE  │
│   COMPUTING DEVICE 510                           │
└─────────────────────────────────────────────────┘
```

FIG. 5

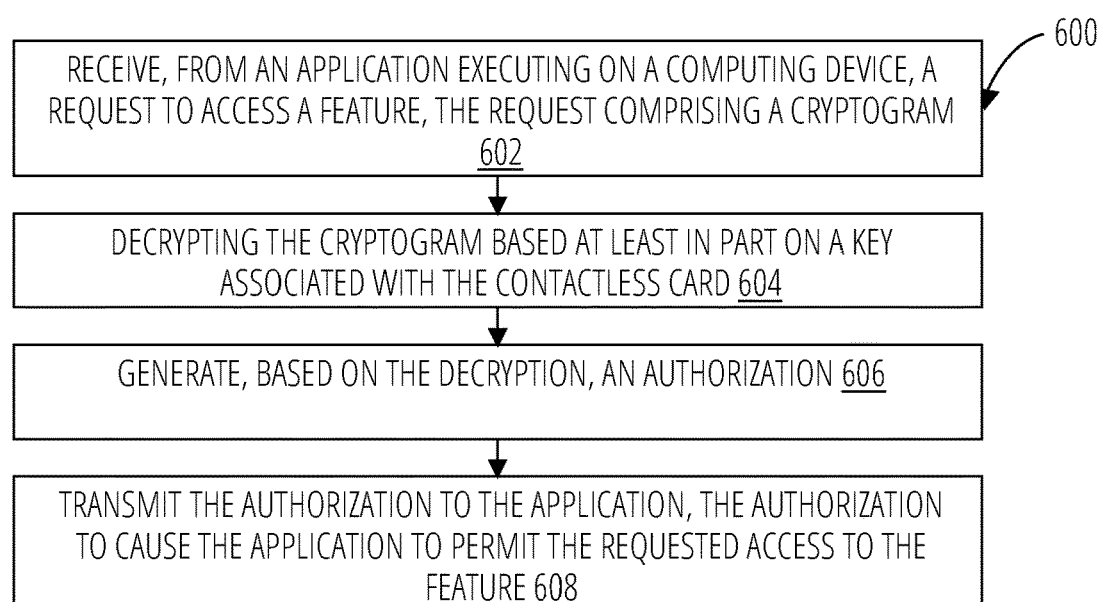

RECEIVE, FROM AN APPLICATION EXECUTING ON A COMPUTING DEVICE, A REQUEST TO ACCESS A FEATURE, THE REQUEST COMPRISING A CRYPTOGRAM
602

DECRYPTING THE CRYPTOGRAM BASED AT LEAST IN PART ON A KEY ASSOCIATED WITH THE CONTACTLESS CARD 604

GENERATE, BASED ON THE DECRYPTION, AN AUTHORIZATION 606

TRANSMIT THE AUTHORIZATION TO THE APPLICATION, THE AUTHORIZATION TO CAUSE THE APPLICATION TO PERMIT THE REQUESTED ACCESS TO THE FEATURE 608

FIG. 6

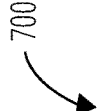
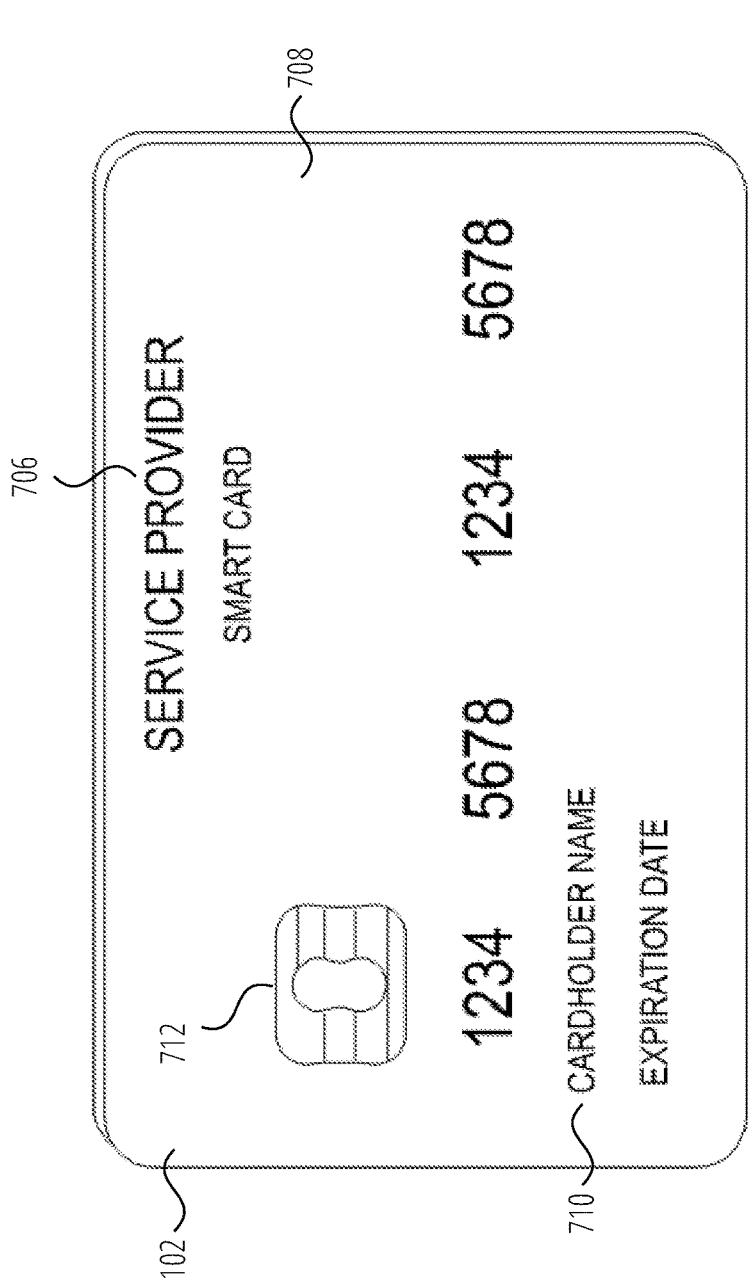
FIG. 7A

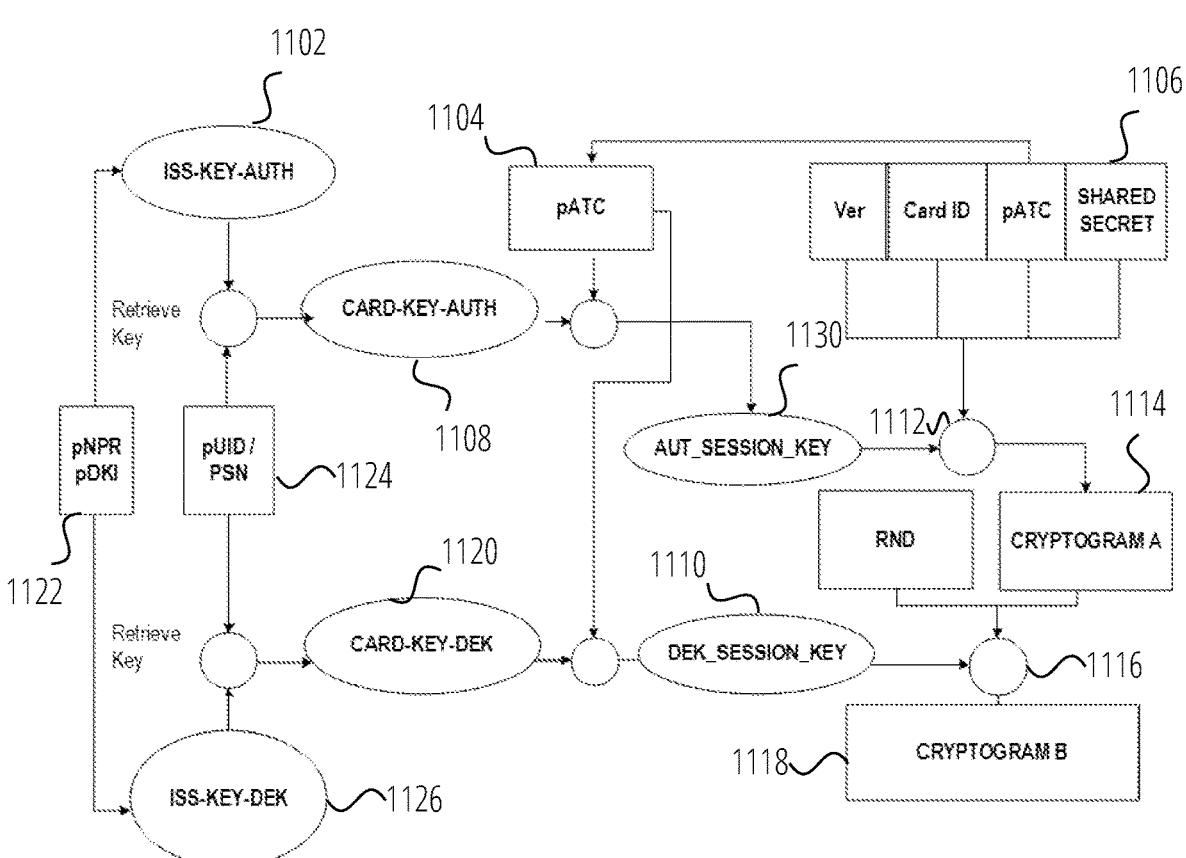
FIG. 11

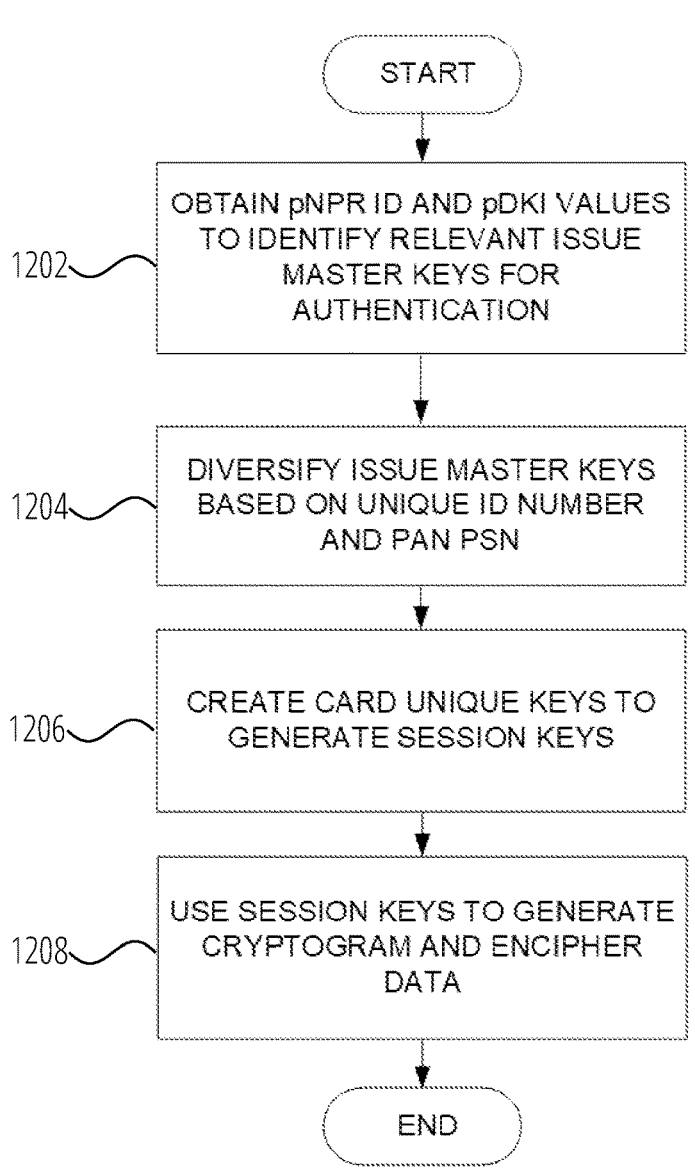
1200
START
1202 — OBTAIN pNPR ID AND pDKI VALUES TO IDENTIFY RELEVANT ISSUE MASTER KEYS FOR AUTHENTICATION
1204 — DIVERSIFY ISSUE MASTER KEYS BASED ON UNIQUE ID NUMBER AND PAN PSN
1206 — CREATE CARD UNIQUE KEYS TO GENERATE SESSION KEYS
1208 — USE SESSION KEYS TO GENERATE CRYPTOGRAM AND ENCIPHER DATA
END
FIG. 12

METHODS AND ARRANGEMENTS FOR SELF-SERVICE PRINTING VIA AUTHENTICATION BASED ON A CONTACTLESS CARD

BACKGROUND

The present application relates to computing technology and facilitates a self-service printing using authentication for improved data security.

Often times physical copies of digital documents and other material are required and/or preferred for consumption of information in such documents and material. However, not everyone may have access to a private printer. Although public printers, such as at libraries, retail stores, may be available, sensitive information, such as confidential, or privileged information, may prohibit the use of such printers. Moreover, the documents may require special printing, such as in the case of certain financial documents (e.g., checks), certain legal documents (e.g., stamp paper), etc. Printing such documents may require access to specialized printers. Accordingly, there is a need to print documents and other material in an authenticated and secure manner to prevent the printed copies from being accessed by third parties.

SUMMARY

According to one or more aspects, a computer-implemented method to enable self-service printing with authentication includes receiving, by a server, a print-request to print a document associated with an account, the print-request received from a computing device. The method further includes adding, by the server, a print job for the document in a print queue associated with the account. The method further includes receiving, by the server, a second request to initiate printing the document associated with the account, the second request received from a printer. The method further includes releasing, by the server, the print queue associated with the account to cause the printer to print the document, the releasing being responsive to the second request being authenticated.

According to one or more aspects, a computer-implemented method to enable self-service printing with authentication includes selecting, by a computing device, for printing, a document associated with an account. The method further includes generating, by the computing device, a list of printers for printing the document, the list is generated based on a type of the document. The method further includes selecting, by the computing device, from the list, a printer to print the document. The method further includes providing, by the computing device, in response to the printer being accessed to print the document, an authentication code that causes the printer to print the document.

According to one or more aspects, a computing apparatus includes a processor, and a memory storing instructions that, when executed by the processor, configure the computing apparatus to receive a first request to print a document associated with an account, the first request received from a computing device. The computing apparatus is further configured to add a print job for the document in a print queue associated with the account. The computing apparatus is further configured to receive a second request to initiate printing the document associated with the document, the second request received from a printer. The computing apparatus is further configured to release the print queue associated with the account to cause the printer to print the document, the release being responsive to the second request being authenticated.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2A illustrates an aspect of the subject matter in accordance with one embodiment.

FIG. 2B illustrates an aspect of the subject matter in accordance with one embodiment.

FIG. 4 illustrates a routine 400 in accordance with one embodiment.

FIG. 5 illustrates a routine 500 in accordance with one embodiment.

FIG. 6 illustrates a routine 600 in accordance with one embodiment.

FIG. 7A illustrates a contactless card in accordance with one embodiment.

FIG. 11 is a diagram of a key system according to an example embodiment.

FIG. 12 is a flowchart of a method of generating a cryptogram according to an example embodiment.

DETAILED DESCRIPTION

Figure 1:
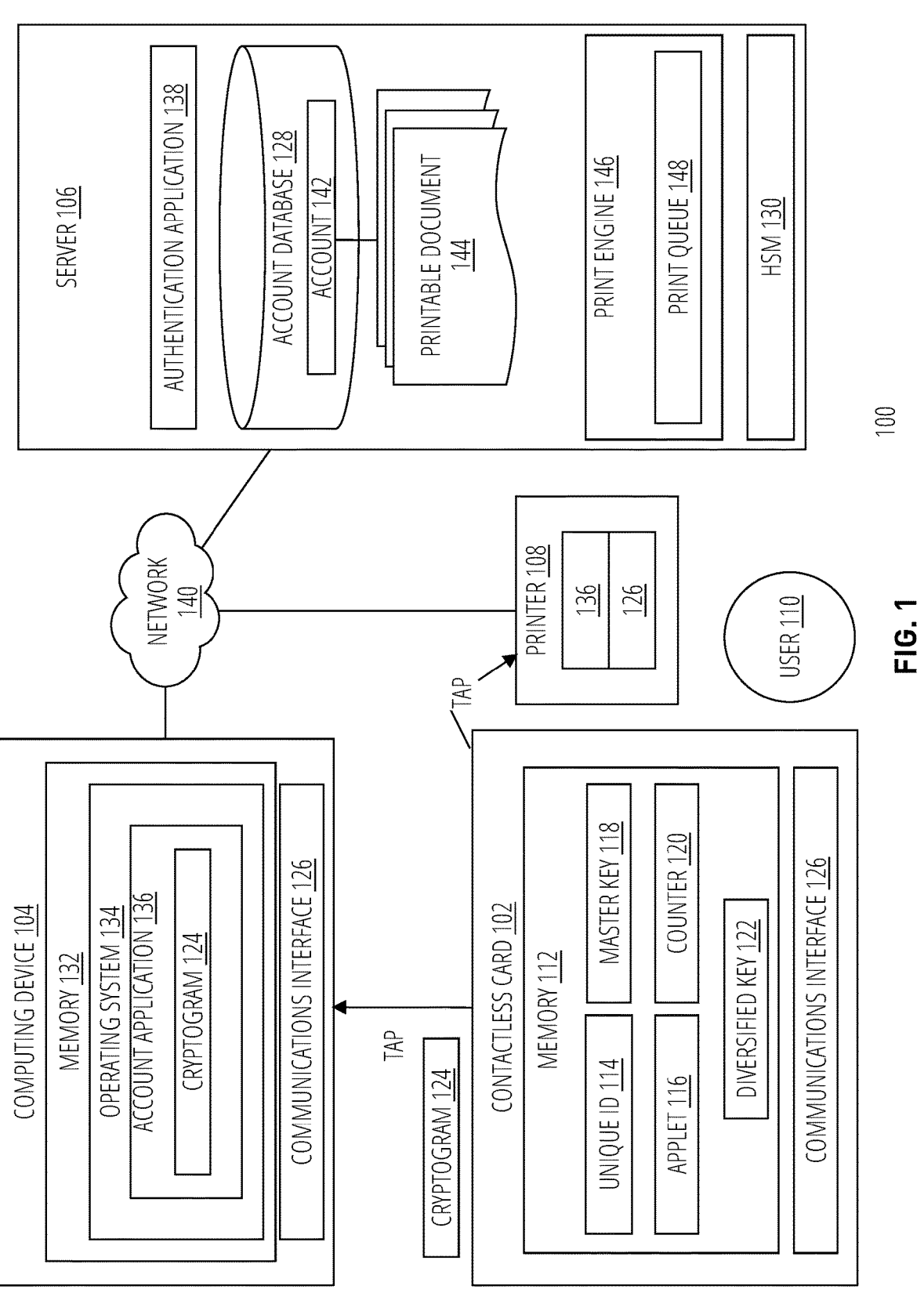
FIG. 1 illustrates an aspect of the subject matter in accordance with one embodiment.

Embodiments disclosed herein provide techniques for secure printing of material using a contactless card to authenticate the user and to verify his/her presence at the time of printing and/or releasing the printed material. To create a print request via a computing device, the computing device may authenticate the user using a contactless card, e.g., using a cryptogram generated by the contactless card. An application executing on the computing device may receive the cryptogram via communications with the contactless card and transmit the cryptogram to a server for verification. The server may give the user access to request printing one or more printable material (e.g., documents, images, etc.) based on verification of the cryptogram. The printable material may be previously generated or dynamically generated upon user's request.

The server may add the requested material to a printing queue. The print queue may be maintained by the server. In some examples, the user may designate a printer. The printer may be a printer device identified as a secure trusted printer by the server. The designated printer may maintain the print queue in some examples. In some examples, the print queue may be specific to the user, the contactless card, or an account associated with the user. Once the user claims to be at a secure trusted printer or at the designated printer, he/she can cause the material to be printed and/or released by authenticating and verifying his/her presence using a contactless card. The same contactless card used at the time of requesting the printing may be required to release the printable material in some cases. Alternatively, different contactless cards associated with the user, or the account, may be used at the time of requesting and releasing.

The server may securely transmit the printable material to the printer. In some embodiments, when the user attempts to release the printable material to generate printed copies, cryptographic verification using the contactless card may be used to authenticate access to the printable material in a print queue. For example, the user may provide the contactless card to the printer, and the printer or associated card reader may read the card and receive the cryptogram. The printer may provide the cryptogram to a server to perform authentication of the user. If the cryptographic verification is not successful, the user may be restricted from accessing the printable material, thereby improving the security of the account.

As additional or alternative security, the user may have to perform a multi-factor authentication to release the printable material from the print queue at the printer. The multi-factor authentication may include using a combination of the contactless card, the computing device, and one or more authentication credentials of the user associated with the account.

Embodiments disclosed herein provide secure techniques to print one or more documents using cryptograms generated by contactless cards and other security measures. By leveraging cryptograms, embodiments of the disclosure may securely verify the identity and presence of the user with minimal risk of fraudulent activity associated with the printed copies. Furthermore, embodiments disclosed herein facilitate a user to print material in a secure manner when the user may not have access to a printer. Further still, embodiments disclosed herein facilitate a server and/or a printer to limit printing of material only to verified users and/or only when the authenticated user is physically present at the printer.

With general reference to notations and nomenclature used herein, the detailed descriptions herein may be presented in terms of program procedures executed on a computer or network of computers. These procedural descriptions and representations are used by those skilled in the art to effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a computer as selectively activated or reconfigured by a computer program stored in the computer. The procedures presented herein are not inherently related to a particular computer or other apparatus. Various machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 123 illustrated as components 123-1 through 123-*a* (or 123*a*) may include components 123-1, 123-2, 123-3, 123-4, and 123-5. The embodiments are not limited in this context.

Embodiments disclosed herein provide techniques to address one or more technical challenges. The technical challenges are related to securely printing material, such as documents, images, etc., from a user's account. The technical challenges addressed herein includes to be able to securely print material from a user's account when the user does not have access to a private printer. Embodiments herein address such a technical challenge by using a contactless card to authenticate and verify the user at the time of printing. Additional security can be provided in some embodiments by using a combination of the contactless card and a computing device (e.g., mobile). Accordingly, technical solutions and improvements are provided to increase security of data access.

Embodiments herein are solutions to internet-centric challenges where data stored in servers (e.g., cloud platform) has to be securely accessed and printed using a public printer. By using one or more of the contactless cards and a computing device, the secure access and printing is facilitated.

Additional improvements and applications provided by embodiments herein include location-based enhancements to identify printers within a predetermined range from the user, such that the identified printer is capable of printing material requested by the user. Further, improvements provided by embodiments described herein also include dynamically generating and printing material based on the user's request when the authorized user is verified to be present at the printer.

Several other improvements to technology, such as printers and servers, to facilitate secure printing and advantages in such technical areas will be apparent to a person skilled in the art based on the description herein.

With general reference to notations and nomenclature used herein, one or more portions of the detailed description which follows may be presented in terms of program procedures executed on a computer or network of computers. These procedural descriptions and representations are used by those skilled in the art to convey the substances of their work most effectively to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 depicts an exemplary system 100, also referred to as a computing architecture, consistent with disclosed embodiments. Although the system 100 shown in Figures herein has a limited number of elements in a certain topology, it may be appreciated that the system 100 may include more or less elements in alternate topologies as desired for a given implementation.

The system 100 comprises one or more contactless cards 102, one or more computing devices 104, one or more servers 106, and one or more printers 108.

The contactless card 102 is representative of any type of card, such as a credit card, debit card, automated teller machine (ATM) card, gift card, payment card, smart card, identification card, and the like. The contactless card 102 is associated with an account 142 of a user 110. The account 142 can be a financial account, a social media account, an employee account, a customer loyalty account (e.g., airline, hotel, restaurant, store, etc.), or any other account associated with the user 110. The user 110 may perform one or more operations using the account 142, and or associated with the account 142. For example, in case of a financial account, the user 110 may conduct transactions such as money transfers, check deposits, bill payments, balance inquiries, reaching customer service, accessing one or more documents, etc. In case of an employee account, the user 110 may conduct operations such as sending/receiving messages, editing documents/records, operating machinery, etc., or any other operations that the user 110 may be expected to perform as part of his/her employment. Messages can be emails, instant messages, or any other types of messages. In case of a loyalty account, the user 110 may perform operations such as purchases, returns, statement inquiries, receipt inquiries, accessing coupons, etc. It is understood that the account 142 can be any type of account, and not limited to the types of accounts listed herein.

The contactless card 102 facilitates authenticating the user 110 to use the account 142. Here, "using" the account 142 can include any operation performed associated with the account 142. For example, using the account can include performing one or more operations associated with the account 142, such as logging into the account 142, accessing resources associated with the account 142, etc. In addition, using the account 142 can include accessing and/or changing one or more settings of the account 142. For example, the settings can include usernames, passwords, demographic information (age, address, gender, etc.), biometric identifiers, financial information (e.g., debt limit, transaction limits, etc.), notification settings (e.g., condition when to generate and send notifications to user 110), etc. The settings can also include access permissions that provide/limit the user's 110 access to one or more physical/digital resources associated with the account 142. The physical resources can include doors, safes, computers, cabinets, devices (e.g., printers, projectors, etc.), apparatus (e.g., lab apparatus, etc.), or any other such resources. Digital resources can include files, computers, other user accounts, databases, etc. Based on the access permissions of the user 110 specified by the account 142, he/she may or may not be authorized to access one or more of the resources (physical/digital). The contactless card 102 addresses the challenge of authenticating the user 110 as described herein.

The account 142 is maintained by the account provider (not shown). The account provider of the account 142 can be a financial institution (e.g., bank, credit union, etc.), an employer, a social media platform, an airline, a restaurant, a hotel, a retailer, or any other entity. The account provider provides the account 142 using a server 106.

As shown, the server 106 includes an authentication application 138 and an account database 128. The account database 128 generally includes information related to one or more accounts, (e.g., account 142), one or more users (e.g., user 110), and one or more contactless cards 102 of the account 142. The account 142 includes the permissions, settings, and other information that facilitates the user 110 to use the account 142 with the contactless card 102. Further, the user 110 can use the account 142 via the computing device 104. In some embodiments, the user 110 can use the account 142 via a combination of the contactless card 102 and the computing device 104. For example, the combination of the contactless card 102 and the computing device 104 is used to perform a multi-factor authentication (MFA) of the user 110. Embodiments described herein, accordingly address a technical challenge of authenticating access to the account 142, which is an electronic account. Embodiments herein, accordingly, address an internet-centric, digital-account-centric challenges in a practical manner. The challenges are addressed using specific computer components, that facilitate authenticating the user 110 by performing a specific sequence of operations.

The computing device 104 is representative of any number and type of computing devices, such as smartphones, tablet computers, wearable devices, laptops, portable gaming devices, virtualized computing system, merchant terminals, point-of-sale systems, servers, desktop computers, and the like. A mobile device may be used as an example of the computing device 104 but should not be considered limiting of the disclosure. The server 106 is representative of any type of computing device, such as an enterprise server, workstation, compute cluster, cloud computing platform, virtualized computing system, and the like. Although not depicted for the sake of clarity, the computing device 104, contactless card 102, and server 106 each include one or more memory devices (e.g., random access memory, storage drives, etc.), one or more processor circuits (central processing unit, graphics processing unit, floating point unit, etc.), to execute programs, code, scripts, and other types of computer-executable instructions.

The contactless card 102 includes one or more communications interfaces 126, such as a radio frequency identification (RFID) chip configured to communicate with a communications interface 126 (also referred to herein as a "card reader", a "wireless card reader", and/or a "wireless communications interface") of the computing devices 104. The communications interfaces 126 may facilitate wireless communication via near field communication (NFC), using the Europay, Mastercard, and VISA standard (EMV), or other short-range protocols in wireless communication. Although NFC is used as an example communications protocol herein, the disclosure is equally applicable to other types of wireless communications, such as Bluetooth™, Bluetooth Low Energy (BLE), and/or Wi-Fi™, etc.

As shown, a memory 112 of the contactless card 102 includes a unique ID 114, an applet 116, one or more master keys 118, a counter 120, and one or more diversified keys 122. The unique ID 114 may be any identifier that uniquely identifies the contactless card 102 relative to other contactless cards 102. In some examples, the unique ID 114 may be an identifier that uniquely identifies user 110 with whom the contactless card 102 is associated. The applet 116 is executable code (i.e., computer-executable instructions) configured to perform some or all of the operations described herein. The counter 120 is a value that is synchronized between the contactless card 102 and server 106. The counter 120 may comprise a number that changes each time data is exchanged between the contactless card 102 and the server 106 (and/or the contactless card 102 and the computing device 104). The counter 120, master keys 118, diversified keys 122, and/or unique ID 114 are used to provide security in the system 100 as described in greater detail below. The memory 112 can include additional components, such as an operating system, images, etc., which are not depicted herein for brevity.

As shown, a memory 132 of the computing device 104 includes an instance of an operating system 134. Example operating systems include the Android® OS, iOS®, operating systems include the Android® OS, iOS®, macOS®, Linux®, and Windows® operating systems. As shown, the operating system 134 includes an account application 136. The account application 136 allows the user 110 to perform various account-related operations, such as viewing account balances, purchasing items, processing payments, accessing one or more resources, printing documents, and the like. The account application 136 is a computer program including one or more computer-executable instructions. In some embodiments, the account application 136 can include computer-executable instructions that are specific to the operating system 134 and/or the computing device 104. Alternatively, or in addition, the account application 136 includes computer-executable instructions that can be executed across different operating systems and computing devices. In some embodiments, the account application 136 may be a web browser that allows the user 110 to access the account 142 via one or more web pages of the account 142. The web pages of the account 142 may by hosted by the server 106 (or another hosting entity).

In some embodiments, the user 110 accesses the account 142 on the server 106 via the account application 136 on the computing device 104 after authenticating using authentication credentials. For example, the authentication credentials may include a username (or login) and password, biometric credentials (e.g., fingerprints, Face ID, palmprints, iris scans, etc.), and the like. In some embodiments, such authentication credentials-based access only facilitates the user 110 to access a subset of features/resources of the account 142. For example, in case of a financial account, the account application 136 may limit the user 110 to only view certain balances and/or information, but not permit the user to perform operations, such as a money transfer. In case of a loyalty account, the user 110 may be prohibited from purchases at such a first level of authentication that provides access to the subset of features/resources. In case of an employee account, the user 110 may be prohibited from viewing emails, or accessing certain premises, etc. To access such prohibited (or secured, second level) features of the account 142 the user 110 has to be authenticated using the contactless card 102.

In some embodiments, the user 110 is authenticated using a gesture-based authentication using the contactless card 102. For example, the user 110 may tap the contactless card 102 to the computing device 104 (or otherwise bring the contactless card 102 within communications range of the communications interface 126 of the computing device 104 104). The account application 136 may then instruct the applet 116 to generate a cryptogram 124. The cryptogram 124 may be generated based on any suitable cryptographic technique. In some embodiments, the cryptogram 124 may be based on the unique ID 114 of the contactless card 102. The contactless card 102 transmits the cryptogram 124 to the account application 136 via the communications interfaces 126. In some cases, a wireless communication using NFC is performed by the communications interfaces 126. In some embodiments, the applet 116 may include the cryptogram 124 and an unencrypted identifier (e.g., the counter 120, the unique ID 114, and/or any other unique identifier) as part of a transmitted data package including the cryptogram 124. In at least one embodiment, the data package is an NDEF file.

In some embodiments, the system 100 is configured to implement key diversification to secure the communicated data, which may be referred to as a key diversification technique herein. Generally, the server 106 and the contactless card 102 may be provisioned with the same master key 118 (also referred to as a master symmetric key). More specifically, each contactless card 102 is programmed with a distinct master key 118 that has a corresponding pair in the server 106. For example, when a contactless card 102 is manufactured, a unique master key 118 may be programmed into the memory 112 of the contactless card 102. Similarly, the unique master key 118 may be stored in a record of the user 110 associated with the contactless card 102 in the account database 128 of the server 106 (and/or stored in a different secure location, such as the hardware security module (HSM) 130). The master key 118 may be kept secret from all parties other than the contactless card 102 and server 106, thereby enhancing security of the system 100. In some embodiments, the applet 116 of the contactless card 102 may encrypt and/or decrypt data (e.g., the unique ID 114) using the master key 118 and the data as input a cryptographic algorithm. For example, encrypting the unique ID 114 with the master key 118 may result in the cryptogram 124. Similarly, the server 106 may encrypt and/or decrypt data associated with the contactless card 102 using the corresponding master key 118. Because the server 106 and the contactless card 102 have the same master key 118, by using the same cryptographic algorithm, the two generate matching cryptograms 124.

Accordingly, the user 110 can be authenticated by matching the cryptograms 124 generated by the contactless card 102 and the server 106. In some embodiments, the computing device 104 transmits the cryptogram 124 received from the contactless card 102 to the server 106. The server 106 verifies authentication of the users 110 by comparing the received cryptogram 124 with the cryptogram 124 generated by the server 106. The server 106 sends a notification indicative of the success of the verification to the computing device 104. If the cryptograms 124 match, the server 106 indicates that the verification was successful. Otherwise, the server 106 indicates that the verification was unsuccessful. The server 106 can communicate the notification to the computing device 104 via the network 140, for example.

In some embodiments, the verification may use additional information apart from the cryptogram 124. Alternatively, or in addition, the cryptogram 124 is generated using data in addition to the unique ID 114. In some embodiments, the master keys 118 of the contactless card 102 and server 106 may be used in conjunction with the counters 120 to enhance security using key diversification. The counters 120 comprise values that are synchronized between the contactless card 102 and server 106. For example, the counters 120 may comprise a number that changes each time data is exchanged between the contactless card 102 and the server 106 (and/or the contactless card 102 and the computing device 104). Here, data exchanged between the contactless card 102 and the server 106 and/or the computing device 104 can include instructions and responses passed between the contactless card 102 and the other device. For example, the applet 116 may provide the master key 118, unique ID 114, and a diversification factor as input to a cryptographic algorithm, thereby producing a diversified key 122. In some embodiments, the diversification factor is the counter 120. The diversified key 122 may then be used to encrypt some data, such as the diversification factor (e.g., the counter 120) or other sensitive data. The applet 116 and the server 106 may be configured to encrypt the same data to facilitate the decryption and/or verification processing of the cryptogram 124.

In some embodiments, when preparing to send data (e.g., to the server 106 and/or the computing device 104), the applet 116 of the contactless card 102 may increment the counter 120. The applet 116 of the contactless card 102 may then provide the master keys 118, unique ID 114, and counter 120 as input to a cryptographic algorithm, which produces a diversified key 122 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 1518. The aforementioned patent application is incorporated by reference herein in its entirety.

The applet 116 may then encrypt some data (e.g., the unique ID 114, the counter 120, a command, and/or any other data) using the diversified key 122 as input to the cryptographic algorithm. For example, encrypting the unique ID 114 the diversified key 122 may result in an encrypted unique ID 114 (e.g., a cryptogram 124).

In some embodiments, two diversified keys 122 may be generated, e.g., based on one or more portions of the input to the cryptographic function. In some embodiments, the two diversified keys 122 are generated based on two distinct master keys 118, the unique ID 114, and the counter 120. In such embodiments, a message authentication code (MAC) is generated using one of the diversified keys 122, and the MAC may be encrypted using the other one of the diversified keys 122. The MAC may be generated based on any suitable data input to a MAC algorithm, such as sensitive data, the unique ID 114, the counter 120, etc. The applet 116 and the server 106 may be configured to generate the MAC based on the same data. In some embodiments, the cryptogram 124 is included in a data package such as an NDEF file. The account application 1310 may then read the data package including cryptogram 124 via the communications interface 126 of the computing device 104.

The account application 136 transmits the cryptogram 124 to the server 106. The server 106 may provide the cryptogram 124 to the authentication application 138 and/or the HSM 130 for verification based at least in part on the instance of the master key 118 stored by the server 106. In some embodiments, the authentication application 138 and/or the HSM 130 may identify the master key 118 and counter 120 using the unencrypted unique ID 114 provided to the server 106. In examples where additional data is used to generate the cryptogram 124, the server 106 may identify the additional data in the account database 128 and/or HSM 130 using the unencrypted unique ID 114. In some examples, the authentication application 138 may provide the master key 118, unique ID 114, and counter 120 as input to the cryptographic function of the HSM 130, which produces one or more diversified keys 122 as output. In other embodiments, the server 106 encrypts the master key 118, unique ID 114, and any additional data to generate the diversified keys 122. The resulting diversified keys 122 may correspond to the diversified keys 122 of the contactless card 102. The generated diversified keys 122 are used to decrypt the cryptogram 124 and/or verify the MAC once decrypted. For example, the server 106 may generate a MAC based on the same data as the applet 116, e.g., the sensitive data, the unique ID 114, the counter 120, and/or any additional data. If the MAC generated by the server 106 matches the decrypted MAC in the cryptogram 124, the server 106 may verify or otherwise successfully authenticate the cryptogram 124.

Regardless of the decryption technique used, the authentication application 138 and/or the HSM 130 may successfully decrypt the cryptogram 124 and verify the MAC, thereby verifying or authenticating the cryptogram 124. If the decryption and/or MAC verification is successful, the authentication application 138 and/or the HSM 130 may generate and transmit a notification indicative that the user 110 has been authenticated. If the authentication application 138 is unable to decrypt the cryptogram 124 (and/or is unable to verify the MAC) the authentication application 138 does not validate the cryptogram 124. In such an example, the authentication application 138 determines to refrain from generating and transmitting a notification. The authentication application 138 may transmit an indication of the failed decryption and/or verification to the computing device 104.

In one or more embodiments, the user 110 may have one or more printable document 144 associated with the account 142. The user 110 may desire to print, i.e., make physical copies of the printable document 144. Alternatively, or in addition, the user 110 may have to print some of the material as per requirements of the account provider. In some embodiments, the one or more printable document 144 may include sensitive and/or secure information that the user 110 may not want to, or may not be permitted to, print unless the printer being used is a trusted secure device. For example, the printable document 144 may include checks, balance statements, boarding passes, coupons, paystubs, confidential/privileged documents, or any other documents that include information that is deemed to be sensitive, privileged, secret, personal, etc., either by the user 110 or the account provider. Hence, printing the one or more printable document 144 is restricted to a trusted printer, such as the printer 108. In other embodiments, the user 110 may not have access to a private printer (e.g., printer at home) and hence, may be printing the printable document 144 (with/without sensitive, privileged, secret, personal, etc., information) at the printer 108, which is a public printer.

Accordingly, a technical challenge exists of creating and executing a secure printing (print job) of the printable document 144 from the account 142, where the printed material is only available upon authentication of the user 110. Further, the technical challenge is to verify that the user 110 is physically present at the printer 108 when the printable document 144 are printed. Embodiments described herein address such technical challenges. The authentication and the verification of the user 110 using the contactless card 102 is used to ensure that the authorized user 110 is physically present at the printer 108 when the requested printable document 144 are being printed. In some embodiments, a combination of the contactless card 102, the computing device 104, and the printer 108 is used by the server 106 to verify that the user 110 is who he/she claims to be before releasing the printable document 144. In some embodiments, the printable document 144 are released for printing by the printer 108 upon performing the authentication and verification of the user 110.

In some embodiments, to process the printing of the printable document 144, the system 100 includes a print engine 146. The print engine 146 is shown as a part of the server 106, however, in other embodiments, the print engine 146 can be part of some other component of the system 100 or may be a separate component by itself. The print engine 146 may be accessible to the user 110 via the account application 136 only when the user 110 has been authenticated using the contactless card 102. Alternatively, or in addition, the user 110 may request to print one or more of the printable documents 144 only upon successful authentication using the contactless card 102. In other words, the user 110 has to create a secure authenticated session with the server 106 to request printing the printable document 144.

The user 110, via the account application 136, can select one or more documents to be printed from the printable document 144. In some embodiments, the printable document 144 have already been generated, e.g., monthly statements, transaction history, etc. Alternatively, or in addition, the user 110 selects a type or description of document to be printed. Subsequently, a corresponding printable document 144 is dynamically generated based on the selection and information provided by the user 110. In some embodiments, the printable document 144 can be generated as soon as the user 110 makes the selection and provides corresponding information. Alternatively, in some embodiments, the printable document 144 is dynamically generated upon the user 110 verifying his/her presence at the printer 108.

The server 106 can add one or more of the printable documents 144 selected/generated for printing to a print queue 148. In some embodiments, the print queue 148 is specific to the user 110 with the contactless card 102. Alternatively, or in addition, the print queue 148 is specific to the account 142, which may have more than one contactless card 102 associated with it. Thus, a first contactless card 102 associated with the account 142 may be used to make a request to print one or more printable documents 144. Subsequently, a second contactless card 102, which is also associated with the same account 142, is used to release the printable documents 144 at the printer 108. Adding a printable document 144 to the print queue 148 may include associating the printable document 144 with additional information, such as information to verify the user 110 to be authenticated to receive printed copies of the printable document 144.

In some embodiments, the printer 108 is designated to print the requested printable document 144 based on the printer 108 being a secure printer 108. A secure printer 108 may be a printer device that is identified by a print engine 146 as a trusted printer device. The printer 108 may be identified as a trusted device based on the printer 108 being connected to the print engine 146 via a secure communication link. Alternatively, or in addition, the printer 108 may include one or more modules and/or trust certificates (not shown) that identify the printer 108 as a trusted device.

Further, in some embodiments, the printer 108 may be identified and designated to print the requested printable document 144 based on one or more attributes of the user 110. For example, the printer 108 may be selected based on a location of the user 110, where the location is automatically identified based on the computing device 104. The location is automatically identified based on a position sensor (not shown) equipped on the computing device 104. The printer 108 may be selected by the server 106 or by the print engine 146. Alternatively, or in addition, the printer 108 may be selected based on a location input by the user 110 via a user interface of the account application 136. Alternatively, or in addition, the attributes of the user 110 used to select the printer 108 may include a historic pattern of printers that the user 110 has previously used and preferred. The preference may be based on an input provided by the user 110. Further, the printer 108 may be selected based on a status of the user 110 as indicated by the contactless card 102. For example, the status can indicate a level of the account 142, e.g., a silver member, a gold member, a diamond member, etc. Any other tiered rating may be used to provide the status levels. The status level may be decided on several factors, such as card expenses, card usage, organizational position, card age, card fees, etc., of the user 110.

In one or more embodiments, the printer 108 is a self-service printer, without any human operator. Accordingly, the technical challenges addressed by embodiments described herein are self-service-kiosk centric, and as such, necessarily require a technical or technological solution. In other words, verifying and/or authenticating the user 110 at the printer 108 has to be done electronically or digitally using one or more computing devices. As such, technical solutions provided by embodiments described herein are rooted in the technical field of self-service printers and provide improvements to the self-service printers by facilitating such devices to authenticate and/or verify the user 110 who has arrived to collect copies of the printable documents 144. Embodiments described herein further provide a practical application of preventing fraudulent activity by enabling a self-service printer to authenticate and verify an identity of the receiving user 110 prior to printing copies of the printable documents 144 for the user 110.

In some embodiments, the printer 108 includes an account application 136. The account application 136 may be substantively similar to the account application 136 on the computing device 104. Alternatively, in some embodiments, the account application 136 may be a limited version of the account application 136 on the computing device 104. For example, the account application 136 on the printer 108 may only have features associated with releasing and printing the printable documents 144, and none of the features associated with selecting the printable documents 144. Accordingly, the account application 136 on the printer 108 may allow the user 110 to access and print the printable documents 144 that s/he has already selected for printing.

In some embodiments, the printer 108 includes the communications interface 126 to facilitate the printer 108 to authenticate the identity of the user 110 via the contactless card 102 as described herein. The communications interface 126 can facilitate the account application 136 to communicate with the contactless card 102, for example, to obtain the cryptogram 124 from the contactless card 102. The communications interface 126 can further facilitate other types of communications by the printer 108, such as with the server 106, the computing device 104, etc. Such communications can include wired and/or wireless communications. The communications interface 126 of the printer 108 may also include machine-readable code scanner, for example, to read machine-readable codes, such as barcodes, quick-response (QR) codes, etc.

In some embodiments, one or more components of the communications interface 126 may be externally equipped onto the printer 108. For example, the communications interface 126 may be part of a separate device that is coupled with the printer 108 to facilitate the printer 108 to communicate using the one or more protocols supported by the communications interface 126.

FIG. 2A is a schematic 300a illustrating an embodiment where a contactless card 102 is tapped to a computing device 104, e.g., to obtain the cryptogram 124. As stated, when the contactless card 102 is tapped to the computing device 104, the applet 116 may generate a cryptogram (e.g., the cryptogram 124). The cryptogram 124 and any other data (e.g., unencrypted unique ID 114) may be included in a data package, such as an NDEF file, that is read by the computing device 104. The computing device 104 may then transmit the cryptogram 124 (and other data) to the server 106 for verification (e.g., decryption and/or MAC verification) as described herein.

FIG. 2B is a schematic 300b illustrating an embodiment where the server 106 verified the cryptogram 124 generated by the contactless card 102 (e.g., see FIG. 2A). Based on the verification, the server 106 may create a one-time password (OTP) 202. The OTP 202 can be a pseudo-random code, for example. In some embodiments, the OTP 202 is generated based on one or more attributes of the account 142 associated with the contactless card 102. The server 106 may then transmit the OTP 202 to the account application 136. As shown, the account application 136 may then display the OTP 202 on the display of the computing device 104. The OTP 202 can include a string of characters. In some embodiments, the OTP 202 includes or is represented as a matrixed code, which is machine-readable. Doing so allows the OTP 202 to be scanned by a code reader. The OTP 202 is used in some embodiments for a multi-factor authentication to verify the user 110.

Figure 3:
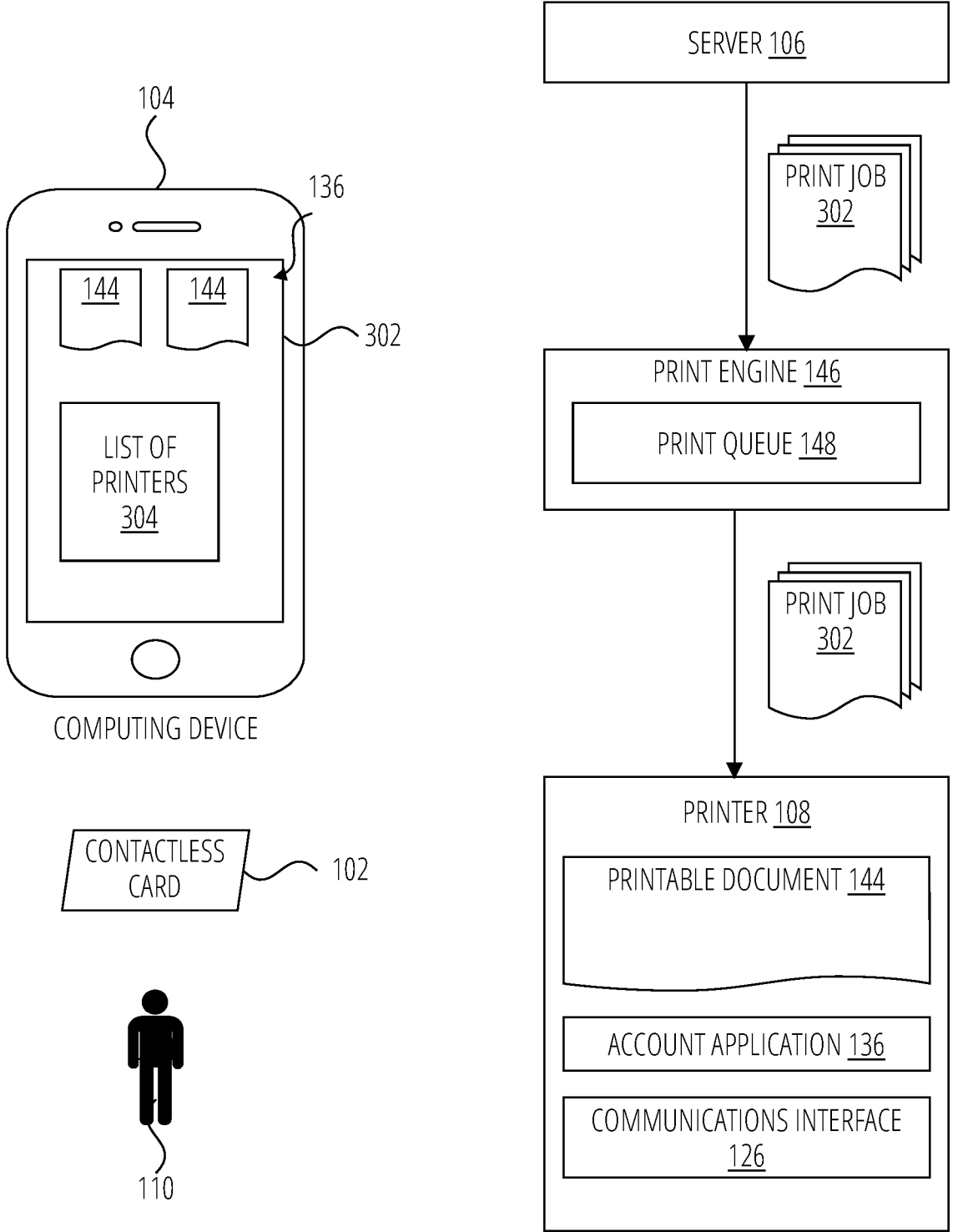
FIG. 3 illustrates an aspect of the subject matter in accordance with one embodiment.

FIG. 3 depicts an example scenario of usage of the system 100. Consider the scenario where the user 110 accesses her bank account 142 via her mobile computing device 104 to select and print a printable document 144. The selected printable document 144 contains sensitive information and has to be printed at a secure printer 108. The user 110 prefers the printer 108 used for the printing to be closer to her work location, rather than her home location. It is understood that the scenario is just one example scenario that is being used as an illustration to describe embodiments herein. The scenario is non-limiting and technical solutions provided by embodiments described herein can be used in several other scenarios in the context of a bank account, or any other type of account.

FIG. 4 illustrates an embodiment of a method, logic flow, or routine 400. The routine 400 may be representative of some or all of the operations executed by one or more embodiments described herein. For example, the routine 400 may include some or all of the operations to complete a print-request to print one or more printable documents 144 at a self-service printer 108 in a secured manner as described herein. Embodiments are not limited in this context.

The routine 400 is described in the context of the example scenario illustrated in FIG. 3. It is understood that the scenario is just one example scenario that is being used as an illustration to describe embodiments herein. The scenario is non-limiting and technical solutions provided by embodiments described herein can be used in several other scenarios in the context of a bank account, or any other type of account. In some embodiments, the operations described herein may be described as being performed by the server 106. However, in other embodiments, the operations can be performed by the server 106, a system including one or more servers, or any other type of device.

In block 402, the server 106 receives a first request to setup a first authenticated session associated with the account 142. The first request is received from the computing device 104, particularly from the account application 136. The account application 136 generates the first request when the user 110 logs into the account application 136. In some embodiments, the user 110 may login to the account application 136 by providing one or more authentication credentials. Alternatively, or in addition, the user 110 may have to verify her identity using the contactless card 102, as described herein. For example, the user 110 may be instructed to bring the contactless card 102 within a predetermined vicinity or range of the computing device 104.

Once the contactless card 102 and the computing device 104 are within communication range for NFC based communication, as described in detail herein, the account application 136 will perform an authentication procedure based on the cryptogram 124 from the contactless card 102, which is transmitted to the server 106 for verification. The description of the authentication procedure is not repeated here for brevity.

In block 404, the server 106 establishes the first authenticated session in response to authenticating the account 142 being accessed via the computing device 104. In some embodiments, the user 110 can avail of printing services for the account 142 only if such an authenticated session is established. For example, if the user 110 only uses authentication credentials to login (first level security) and does not provide the contactless card 102 for further verification (second level security), the user 110 may avail of a limited subset of features of the account 142. Such a subset of features may not include the printing services offered by the account 142. In other embodiments, the user 110 may avail of the printing services even at the first level security.

In block 406, the server 106 receives, during the first authenticated session, a print-request to print a printable document 144 associated with the account 142. For example, the user 110 may select to print bank statements for specific month(s). Alternatively, or in addition, the user 110 may select to print a receipt of a one or more transactions. Alternatively, or in addition, the user 110 may select to print a check, such as a cashier's check. It is understood that the user 110 may not be limited to the example printable documents 144 listed herein.

In block 408, the server 106, adds a print queue 148 to the print queue 148, the print job is for the selected printable documents 144. The print queue 148 may include all of the selected printable documents 144. Alternatively, in some embodiments, each printable document 144 may be added as a separate print queue 148 to the print queue 148. A print queue 148 for a printable document 144 may include an identifier and an image of the one or more printable documents 144 in the print queue 148. The image of the printable document 144 is what is printed by the printer 108 to create a physical copy of the printable document 144.

In some embodiments, adding the print queue 148 includes creating a print queue 148 in the print engine 146 for the account 142. In some embodiments, the print queue 148 may be associated with the account 142. The server 106 creates the print queue 148 for the account 142 using an application programming interface (API) for the print engine 146. Creating the print queue 148 may include executing one or more commands specifying an identifier of the account 142. Once the print queue 148 is created, the print queue 148 is added to the print queue 148. In some embodiments, the print queue 148 has a predetermined expiration, e.g., 24 hours, 48 hours, or any other such duration. After expiration of the duration, the print queue 148 is deleted by the print engine 146 from the print queue 148. In some embodiments, the print engine 146 may generate a notification to the user 110 indicating that the print queue 148 is about to expire. Such a notification may be provided via the account application 136 on the computing device 104. The notification may be provided at a predetermined duration before the preset expiration, for example, 4 hours prior, 8 hours prior, 1 hour prior, etc. The user 110 may respond to such an expiration notification by renewing the print queue 148. The renewal may be for the same or a different predetermined expiration. In some embodiments, such a renewal process may be limited only to a predetermined number of times, e.g., 3, 5, etc.

In some embodiments, the print queue 148 may have a predetermined expiration. If the print queue 148 is empty, i.e., has no print queues 148, the print engine 146 may remove (delete) the print queue 148. Otherwise, the print engine 146 delays removal of the print queue 148 that is not empty by a predetermined duration.

The print queue 148 may be accessible when the account 142 is accessed. The user 110 may access the print queue 148 via the account application 136. In some embodiments, the user 110 can see, edit, delete one or more print queues 148 in the print queue 148 until the print queues 148 are released for printing at the printer 108.

In some embodiments, at the time of adding the print queue 148 to the print queue 148, the user 110 may select the printer 108. The selection of the printer 108 depends on one or more attributes as described herein. In some embodiments, selecting the printer 108 may depend on the type of the one or more printable documents 144 selected. For example, if a selected printable document 144 is of a particular type, the printer 108 may have to have the authority and/or capability to print that type of printable document 144. For example, the type of the printable document 144 may be but not limited to a report, an account statement, a transaction history, a check, a money transfer instruction, a form, a letter, an offer, or a combination thereof. Of these, printing a check may require a higher level of trust than an account statement, for example. Accordingly, only a limited number of printers 108 may have the capability and resources (e.g., special paper, special ink, special print head, etc.) to print such a type of printable document 144 (e.g., check). Therefore, only the printer 108 from such a limited set of printers 108 may be selected. In another case, for the printable document 144, such as the account statement, which may not require such a higher level of trust, any printer 108 that provides the verified printing can be used.

The printer 108 may be selected from one or more self-service printers that are installed at one or more locations of the account provider. For example, such self-service printers may be placed at bank locations, pharmacies, grocery stores, gas stations, printing-service stores, airports, railway stations, or any other locations selected by the account provider.

In some embodiments, the account application 136 displays to the user 110 a list of printers 304 that can be used for printing the selected printable documents 144 based on the types of the one or more printable documents 144 selected. The displayed list of printers 304 may be filtered and/or sorted according to one or more attributes of the user 110. For example, the displayed list of printers 304 may be sorted according to the user's recent visits and/or transactions to the one or more printers. Alternatively, the displayed list of printers 304 may be sorted according to a distance, travel time, or other such location-based information based on the present location of the user 110. The present location of the user 110 may be determined using a position sensor of the computing device 104. In some embodiments, the user 110 may manually filter, sort, and expand the list of printers 304 suggested via the user interface.

In some embodiments, the user 110 may not select the printer 108 when the print job 302 is created and added into the print queue 148. Instead, the user 110 may proceed to any one of printers without a selection to release the printable documents 144 that are queued in the print queue 148.

Alternatively, the user 110 proceeds to a selected printer 108 to release the printable documents 144 that are queued in the print queue 148.

In block 410 of the routine 400 the server 106 receives a request to initiate a second authenticated session associated with the account 142. The second request may be received from the printer 108 at which the user 110 desires to release the printable documents 144 that are queued. In some embodiments, the printer 108 may have the account application 136. In some embodiments, the account application 136 of the printer 108 provides a limited set of features compared to the account application 136 available on the computing device 104.

In response to receiving the request, the server 106 prompts the printer 108 to perform the authentication procedure described herein. Accordingly, the printer 108 requests the user 110 to tap the contactless card 102 to the printer 108 or a designated location to authenticate his/her identity. The account application 136 obtains the cryptogram 124 from the contactless card 102 via the communications interface 126 of the printer 108. In some embodiments, the same contactless card 102 that was used to initiate the first authenticated session has to be used to initiate the second authenticated session. Alternatively, a second contactless card 102 (different from the contactless card 102 used to initiate the first authenticated session) may be used to initiate the second authenticated session, where the second contactless card 102 is also associated with the account 142.

The account application 136 transmits the cryptogram 124 obtained from the presented contactless card 102 to the server 106 for verification. If the authentication of the identity of the user 110 fails, the printer 108 notifies the user 110 that the authentication failed. Accordingly, the print jobs 302 in the print queue 148 are not accessible to the printer 108, and the printable documents 144 cannot be printed.

In some embodiments, the printer 108 may not have the capability to receive and/or transmit the cryptogram 124 from the contactless card 102. In such cases, in response to the request for the second authenticated session, the server 106 prompts the computing device 104 to perform the authentication procedure using the contactless card 102. Upon completion of the authentication procedure, the computing device 104 receives the OTP 202 from the server 106. The OTP 202 is entered into the printer 108 to verify the identity of the user 110. In some embodiments, the OTP 202 is entered manually, for example, using a keyboard or another input device. Alternatively, the OTP 202 may be electronically received by the printer 108 from the computing device 104, for example, using a machine-readable code reader, such as a barcode scanner, a QR-code scanner, a camera, etc. The code reader (not shown) of the printer 108 scans the machine-readable portion of the OTP 202. Upon receiving the OTP 202 from the printer 108, the server 106 completes authenticating the user 110 and deems that the verified user 110 is requesting the release of the printable documents 144 at the printer 108.

In some embodiments, the authentication used to initiate the second authenticated session may be different from the authentication used to initiate the first authenticated session. For example, authenticating the account 142 in response to the first request for the first authenticated session from the computing device 104 a first authentication routine is used. The first authentication routine may be based only on authentication credentials, without using the contactless card 102. For example, the first authentication routine may be based on one or more settings of the account application 136 stored on the computing device 104. The authenticating of the account 142 by the printer 108 may use a second authentication routine, different from the first authentication routine. This may be because the computing device 104 may be a trusted private device of the user 110 that the user 110 has registered with the account 142 and has been using over a certain duration. In contrast, the printer 108 may be a public device, and therefore not as secure or trusted as the computing device 104. Therefore, a higher level of authentication may be used to authenticate the second request compared to the level of authentication used to authenticate the first request. Accordingly, the second authentication routine may use the contactless card 102 to enhance the security.

In block 412, the server, initiates the second authenticated session in response to successfully authenticating the account 142 at the printer 108. The server 106 may notify the print engine 146 to release the print queue 148 associated with the account 142 of the verified user 110 to the printer 108. Further, in block 414, the print engine 146 releases the print queue 148 associated with the account 142 to the printer 108. In some embodiments, the print engine 146 and/or the server 106 verifies that the printer 108 is authorized to print the printable document 144 based on the type of the printable documents 144. Additionally, or alternatively, the print engine 146 and/or the server 106 may verify that the printer 108 is capable to print the printable documents 144.

In some embodiments, such verification may include checking that the printer 108 has the resources available to print the selected printable documents 144. Resources checked may include but are not limited to ink, paper, printer head, etc. The resources are checked based on the type of the printable documents 144. For example, if one of the printable documents 144 requires a particular type of resource, then it is verified that the printer 108 has the particular types of resources available.

Accordingly, the printer 108 receives the print jobs 302 from the print queue 148. In block 416, the printer 108 prints the printable documents 144 from the print jobs 302. In some embodiments, the printer 108 performs the authentication procedure using the contactless card 102 after completing one or more print jobs 302. In some embodiments, the printer 108 performs the authentication procedure using the contactless card 102 after printing one or more printable documents 144. In this way, the printer 108 ensures that the user 110 is still present to collect the printed copies of the printable documents 144 being printed by the printer 108.

FIG. 5 illustrates an embodiment of a method, logic flow, or routine 500. The routine 500 may be representative of some or all of the operations executed by one or more embodiments described herein. For example, the routine 500 may include some or all of the operations to select and print one or more printable documents 144 at a self-service printer 108 in a secured manner as described herein. Embodiments are not limited in this context. In some embodiments, the operations described herein may be described as being performed by a particular device. However, in other embodiments, the operations can be performed by any of the devices described herein, or a combination thereof.

In block 502, the user 110 selects via the computing device 104, for printing, a printable document 144 associated with the account 142. The user 110 selects the printable document 144 from a several printable documents 144 selectable from the account application 136. The user can select the printable document 144 via the account application 136 only upon successful authentication of his/her identity. The authentication may be performed using a limited authentication, for example, using the authentication credentials of the user 110 only (without the contactless card 102). In some embodiments, the authentication is performed using the contactless card 102.

In block 504, upon selection of the printable document 144, a list of printers 304 for printing the selected printable document 144 is generated and displayed. The list of printers 304 may be generated by the computing device 104. In some embodiments, the list of printers 304 may be generated by the server 106. The list of printers 304 is generated based on a type of the selected printable document 144. The type of the printable document 144 may be one of a report, an account statement, a transaction history, a check, a money transfer instruction, a form, a letter, an offer, or a combination thereof. In some embodiments, the type of the selected printable document 144 may be privileged and non-privileged. Based on the type of the printable document 144, a printer 108 may or may not be permitted to print the printable document 144. For example, if the type of the printable document 144 is privileged, then only a subset of the printers 108 can be used to print that printable document 144. Whereas, in case of a non-privileged printable document 144, any printer 108 may be used. The subset of printers for the privileged printable document 144 may have additional resources compared to other printers. For example, the subset of printers may have special ink, special paper, special printer heads, additional security, end-to-end encryption, communications interface 126, etc.

Further, the list of printers 304 may be generated based on other attributes, such as a location of the user 110. The location may be determined based on the computing device 104, in some embodiments. Alternatively, the user 110 may specify a target location, and the list of printers 304 is generated based on the target location. For example, the list of printers 304 includes first N closest printers that are authorized to print the selected printable document 144. Alternatively, the list of printers 304 includes printers that are authorized to print the selected printable document 144 and within a certain predetermined distance, travel time, of the target location. Other filters may be used to generate the list of printers 304.

The list of printers 304 is displayed to the user 110 via the account application 136. The list of printers 304 may be selectable in some embodiments.

In block 506, the user selects from the list of printers 304, the printer 108 to print the printable document 144. The user proceeds to the selected printer 108.

In block 508, the computing device 104 provides, an authentication code (OTP 202) for the user to access the printer 108 to print the printable document 144. The authentication code is provided by the server 106 via the computing device 104 in response to the user 110 requesting the server 106 to release the printable document 144 to the printer 108. The user 110 may request such a release of the printable document 144 via the printer 108, for example, using the account application 136 of the printer 108. The server 106, in response, prompts the user 110 via the computing device 104 to verify his/her identity using the contactless card 102. The authentication procedure described herein is performed based on the computing device 104 accessing the cryptogram 124 from the contactless card 102 and transmitting the cryptogram 124 to the server 106 for verification. The server 106 provides the authentication code, i.e., OTP 202 to the computing device 104 in response to successful verification/authentication.

In block 510, the printer 108 receives and prints the printable document 144 in response to receiving the authentication code from the computing device 104. The authentication code can be scanned by the printer 108 from the computing device 104 using a scanner, such as a barcode scanner, camera, QR-code scanner, an NFC reader, or any other machine-readable code scanner. Alternatively, the user 110 enters the authentication code from the computing device manually into the printer 108. The printer 108 communicates the authentication code to the server 106, which releases the printable document 144 to the printer 108 upon the authentication code matching the generated authentication code.

FIG. 6 illustrates an embodiment of a logic flow, or routine 600. The routine 600 may be representative of some or all of the operations executed by one or more embodiments described herein. For example, the routine 600 may include some or all of the operations to perform an authentication procedure, for example, to enable the user 110 to access one or more features of the account 142. Embodiments are not limited in this context. In some embodiments, the operations described herein may be described as being performed by a particular device. However, in other embodiments, the operations can be performed by any of the devices described herein, or a combination thereof.

In block 602, the server 106 receives from an account application 136, a request to access a feature of the account 142. The feature may be to create a print-request, to release the print queue 148, etc. The account application 136 may be executing on the computing device 104, the printer 108, etc. The received request includes or is associated with the cryptogram 124. The cryptogram 124 is obtained by the account application 136 from the contactless card 102.

In block 604, the server 106 may decrypt the cryptogram 124 by generating one or more diversified keys 122 based on the master key 118 and a counter 120. The server 106 may further verify the cryptogram 124, e.g., determine that a MAC generated by the server 106 matches a MAC in the decrypted cryptogram 124.

In block 606, the server 106 may generate an authorization based on the successful decryption and verification. The authorization may generally indicate that the requested access to the feature of the account 142 is to be permitted.

In block 608, the server 106 transmits the authorization to the account application 136. The authorization may cause the account application 136 to permit the requested access to the feature. In some embodiments, however, the verification may not be successful, in which case, the account application 136 prohibits the user 110 from accessing the requested feature.

FIG. 7A is a schematic 700 illustrating an example configuration of a contactless card 102, which may include a payment card, such as a credit card, debit card, or gift card, issued by a service provider as displayed as service provider indicia 706 on the front or back of the contactless card 102. In some examples, the contactless card 102 is not related to a payment card, and may include, without limitation, an identification card. In some examples, the transaction card may include a dual interface contactless payment card, a rewards card, and so forth. The contactless card 102 may include a substrate 708, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the ISO/IEC 7816 standard, and the transaction card may otherwise be compliant with the ISO/IEC 14443 standard. However, it is understood that the contactless card 102 according to the present disclosure may have different characteristics, and the present disclosure does not require a transaction card to be implemented in a payment card.

The contactless card 102 may also include identification information 710 displayed on the front and/or back of the card, and a contact pad 712. The contact pad 712 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 102 may also include processing circuitry, antenna and other components as will be further discussed in FIG. 7B. These components may be located behind the contact pad 712 or elsewhere on the substrate 708, e.g., within a different layer of the substrate 708, and may electrically and physically coupled with the contact pad 712. The contactless card 102 may also include a magnetic strip or tape, which may be located on the back of the card (not shown in FIG. 7A). The contactless card 102 may also include a Near-Field Communication (NFC) device coupled with an antenna capable of communicating via the NFC protocol. Embodiments are not limited in this manner.

Figure 7B:
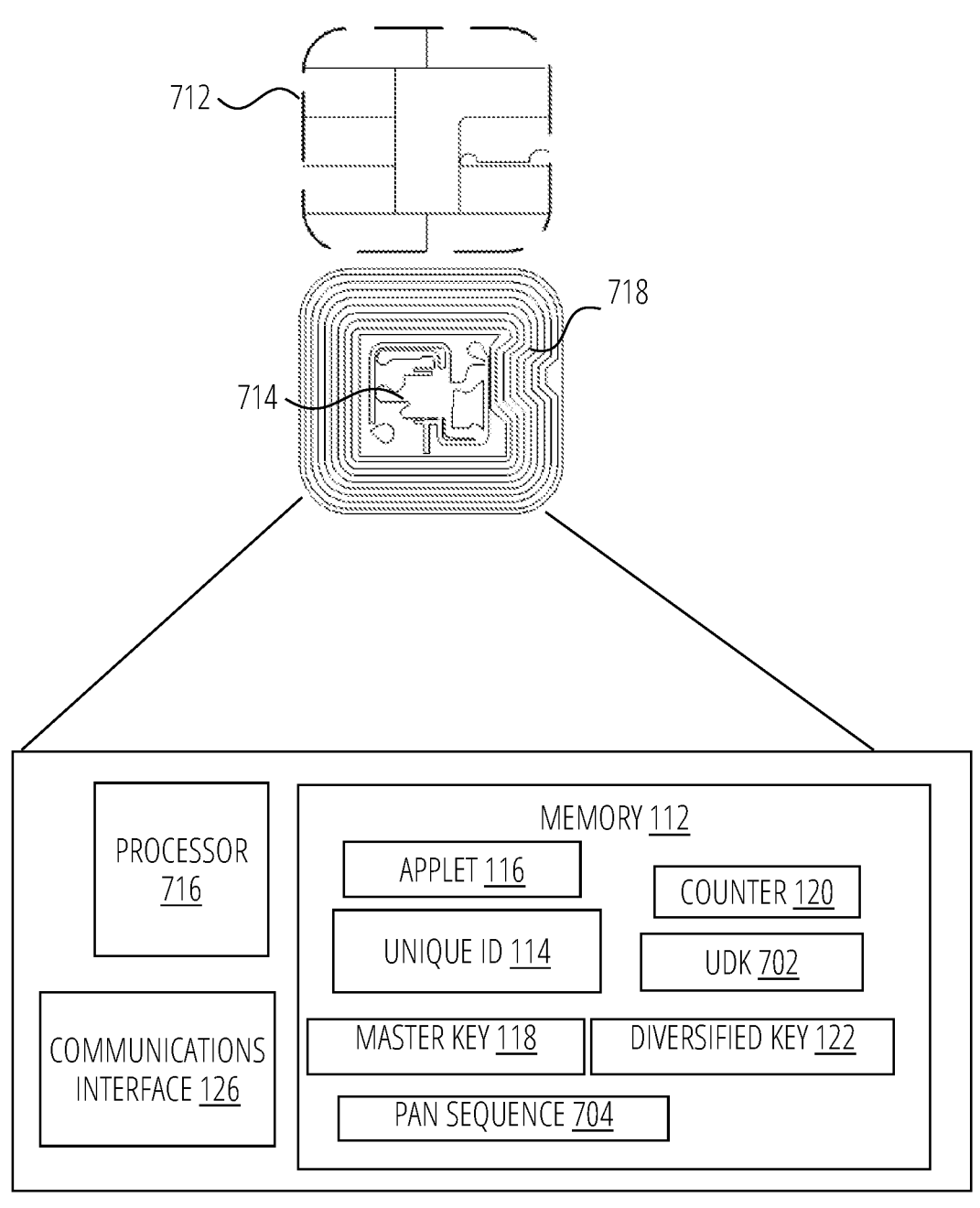
FIG. 7B illustrates a contactless card 102 in accordance with one embodiment.

As illustrated in FIG. 7B, the contact pad 712 of contactless card 102 may include processing circuitry 714 for storing, processing, and communicating information, including a processor 716, a memory 112, and one or more communications interface 126. It is understood that the processing circuitry 714 may contain additional components, including processors, memories, error and parity/CRC checkers, data encoders, anticollision algorithms, controllers, command decoders, security primitives and tamper-proofing hardware, as necessary to perform the functions described herein.

The memory 112 may be a read-only memory, write-once read-multiple memory, or read/write memory, e.g., RAM, ROM, and EEPROM, and the contactless card 102 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 112 may be encrypted memory utilizing an encryption algorithm executed by the processor 716 to encrypted data.

The memory 112 may be configured to store one or more applet 116, one or more counters 120, a unique ID 114, the master key 118, the UDK 702, diversified key 122, and the PAN sequence 704. The one or more applets 116 may comprise one or more software applications configured to execute on one or more contactless cards 102, such as a Java® Card applet. However, it is understood that applets 116 are not limited to Java Card applets, and instead may be any software application operable on contactless cards or other devices having limited memory. The one or more counters 120 may comprise a numeric counter sufficient to store an integer. The unique ID 114 may comprise a unique alphanumeric identifier assigned to the contactless card 102, and the identifier may distinguish the contactless card 102 from other contactless cards 102. In some examples, the unique ID 114 may identify both a customer and an account assigned to that customer.

The processor 716 and memory elements of the foregoing exemplary embodiments are described with reference to the contact pad 712, but the present disclosure is not limited thereto. It is understood that these elements may be implemented outside of the contact pad 712 or entirely separate from it, or as further elements in addition to processor 716 and memory 112 elements located within the contact pad 712.

In some examples, the contactless card 102 may comprise one or more antenna(s) 718. The one or more antenna(s) 718 may be placed within the contactless card 102 and around the processing circuitry 714 of the contact pad 712. For example, the one or more antenna(s) 718 may be integral with the processing circuitry 714 and the one or more antenna(s) 718 may be used with an external booster coil. As another example, the one or more antenna(s) 718 may be external to the contact pad 712 and the processing circuitry 714.

In an embodiment, the coil of contactless card 102 may act as the secondary of an air core transformer. The terminal may communicate with the contactless card 102 by cutting power or amplitude modulation. The contactless card 102 may infer the data transmitted from the terminal using the gaps in the power connection of the contactless card 102, which may be functionally maintained through one or more capacitors. The contactless card 102 may communicate back by switching a load on the coil of the contactless card 102 or load modulation. Load modulation may be detected in the terminal's coil through interference. More generally, using the antenna(s) 718, processor 716, and/or the memory 112, the contactless card 102 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet 116 may be added to contactless cards to provide a one-time password (OTP) for MFA in various mobile application-based use cases. Applet 116 may be configured to respond to one or more requests, such as near field data exchange requests, from a reader, such as a mobile NFC reader (e.g., of a mobile computing device 104 or point-of-sale terminal) and produce an NDEF message that comprises a cryptographically secure OTP encoded as an NDEF text tag. The NDEF message may include a cryptogram such as the cryptogram 124, and any other data.

One example of an NDEF OTP is an NDEF short-record layout (SR=1). In such an example, one or more applet 116 may be configured to encode the OTP as an NDEF type 4 well known type text tag. In some examples, NDEF messages may comprise one or more records. The applet 116 may be configured to add one or more static tag records in addition to the OTP record.

In some examples, the one or more applet 116 may be configured to emulate an RFID tag. The RFID tag may include one or more polymorphic tags. In some examples, each time the tag is read, different cryptographic data is presented that may indicate the authenticity of the contactless card 102. Based on the one or more applet 116, an NFC read of the tag may be processed, the data may be transmitted to a server, such as a server of a banking system, and the data may be validated at the server.

In some examples, the contactless card 102 and server may include certain data such that the card may be properly identified. The contactless card 102 may include one or more unique identifiers (not pictured). Each time a read operation takes place, the counter 120 may be configured to increment. In some examples, each time data from the contactless card 102 is read (e.g., by a mobile device), the counter 120 is transmitted to the server for validation and determines whether the counter 120 are equal (as part of the validation) to a counter of the server.

The one or more counter 120 may be configured to prevent a replay attack. For example, if a cryptogram has been obtained and replayed, that cryptogram is immediately rejected if the counter 120 has been read or used or otherwise passed over. If the counter 120 has not been used, it may be replayed. In some examples, the counter that is incremented on the contactless card 102 is different from the counter that is incremented for transactions. The contactless card 102 is unable to determine the application transaction counter 120 since there is no communication between applets 116 on the contactless card 102. In some examples, the contactless card 102 may comprise a first applet 440-1, which may be a transaction applet, and a second applet 440-2. Each applet 440-1 and 440-2 may comprise a respective counter 120.

In some examples, the counter 120 may get out of sync. In some examples, to account for accidental reads that initiate transactions, such as reading at an angle, the counter 120 may increment but the application does not process the counter 120. In some examples, when the mobile device 10 is woken up, NFC may be enabled and the computing device 104 may be configured to read available tags, but no action is taken responsive to the reads.

To keep the counter 120 in sync, an application, such as a background application, may be executed that would be configured to detect when the computing device 104 wakes up and synchronize with the server of a banking system indicating that a read that occurred due to detection to then move the counter 120 forward. In other examples, Hashed One Time Password may be utilized such that a window of mis-synchronization may be accepted. For example, if within a threshold of 10, the counter 120 may be configured to move forward. But if within a different threshold number, for example within 10 or 600, a request for performing re-synchronization may be processed which requests via one or more applications that the user tap, gesture, or otherwise indicate one or more times via the user's device. If the counter 120 increases in the appropriate sequence, then it possible to know that the user has done so.

The key diversification technique described herein with reference to the counter 120, master key 118, UDK 702, and diversified key 122, is one example of encryption and/or decryption a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. Triple DES (3DES) algorithm may be used by EMV, and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 102 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 8:
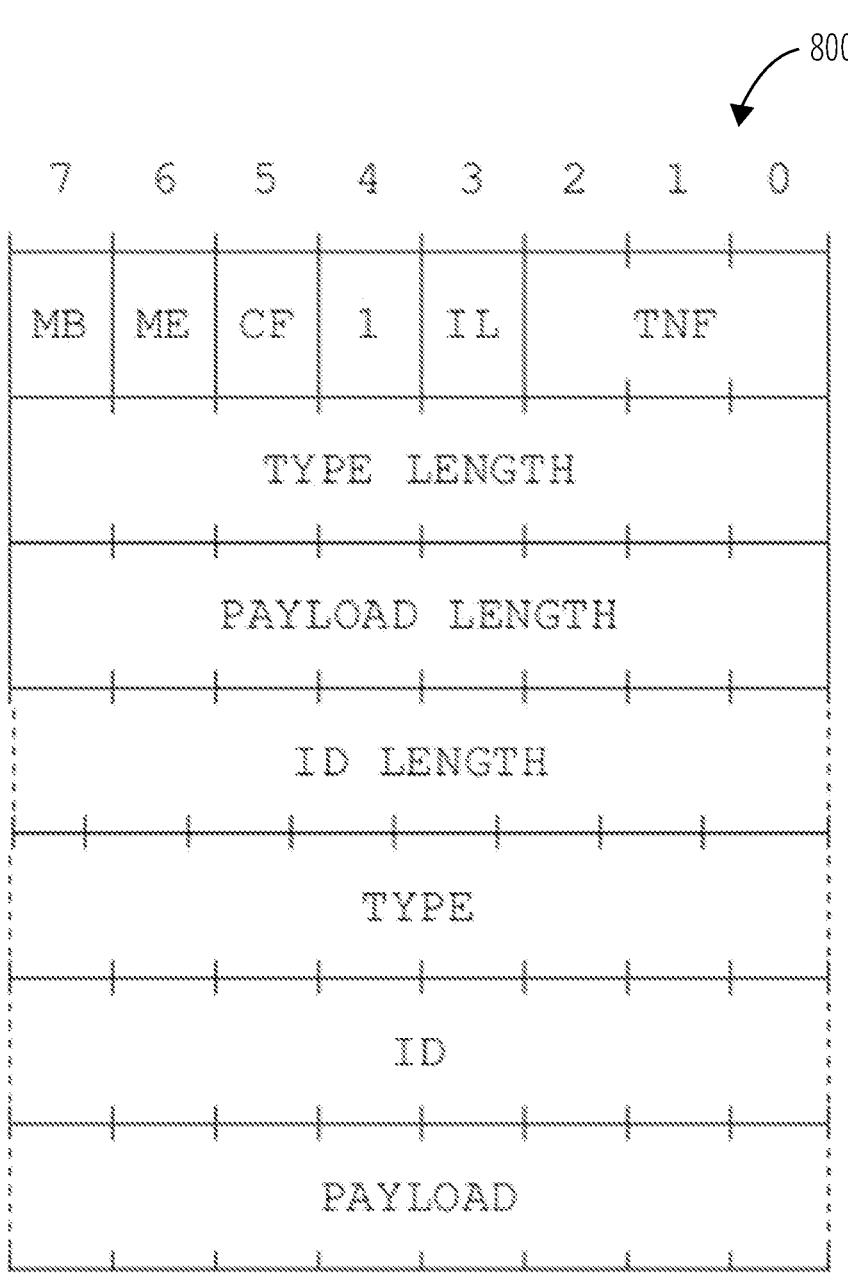
FIG. 8 illustrates a data structure 800 in accordance with one embodiment.

FIG. 8 illustrates an NDEF short-record layout (SR=1) data structure 800 according to an example embodiment. One or more applets 116 may be configured to encode an OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. The data structure 800 may include a cryptogram such as cryptogram 124 or cryptogram 202, and any other data provided by the applet 116.

Figure 9:
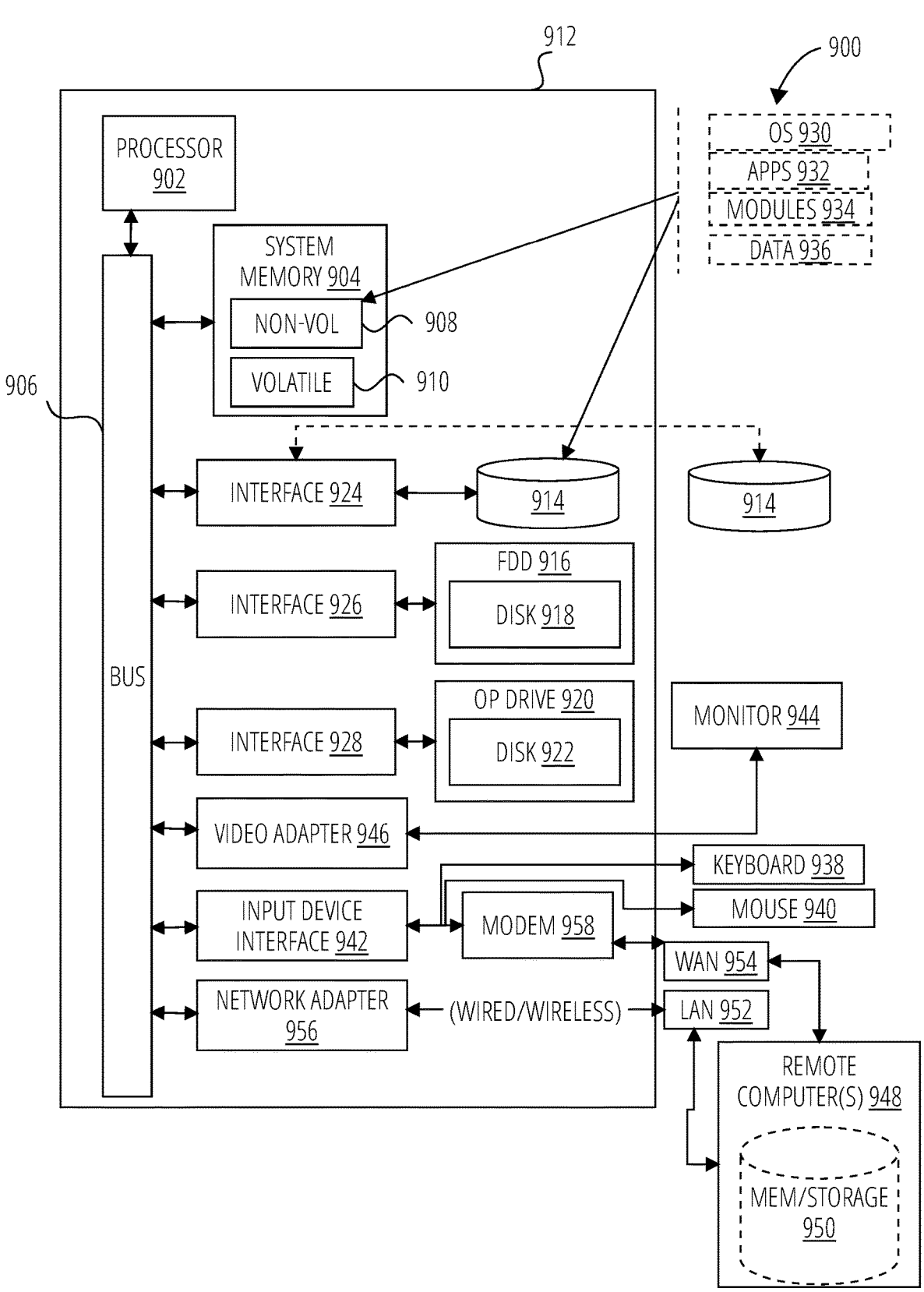
FIG. 9 illustrates a computer architecture 900 in accordance with one embodiment.

FIG. 9 illustrates an embodiment of an exemplary computer architecture 900 suitable for implementing various embodiments as previously described. In one embodiment, the computer architecture 900 may include or be implemented as part of system 100.

As used in this application, the terms "system" and "component" are intended to refer to a computer-related entity, either hardware, a combination of hardware and software, software, or software in execution, examples of which are provided by the exemplary computing computer architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 900 includes various common computing elements, such as one or more processors, multicore processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing computer architecture 900.

As shown in FIG. 9, the computer architecture 900 includes a computer 912 comprising a processor 902, a system memory 904 and a system bus 906. The processor 902 can be any of various commercially available processors. The computer 912 may be representative of the computing device 104 and/or the server 106.

The system bus 906 provides an interface for system components including, but not limited to, the system memory 904 to the processor 902. The system bus 906 can be any of several types of bus structure that may further interconnect to a memory bus (with or without a memory controller), a peripheral bus, and a local bus using any of a variety of commercially available bus architectures. Interface adapters may connect to the system bus 906 via slot architecture. Example slot architectures may include without limitation Accelerated Graphics Port (AGP), Card Bus, (Extended) Industry Standard Architecture ((E) ISA), Micro Channel Architecture (MCA), NuBus, Peripheral Component Interconnect (Extended) (PCI(X)), PCI Express, Personal Computer Memory Card International Association (PCMCIA), and the like.

The computer architecture 900 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 904 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 904 can include non-volatile 908 and/or volatile 910. A basic input/output system (BIOS) can be stored in the non-volatile 908.

The computer 912 may include various types of computer-readable storage media in the form of one or more lower speed memory units, including an internal (or external) hard disk drive 914, a magnetic disk drive 916 to read from or write to a removable magnetic disk 918, and an optical disk drive 920 to read from or write to a removable optical disk 922 (e.g., a CD-ROM or DVD). The hard disk drive 914, magnetic disk drive 916 and optical disk drive 920 can be connected to the system bus 906 by an HDD interface 924, and FDD interface 926 and an optical disk drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 908, and volatile 910, including an operating system 930, one or more applications 932, other program modules 934, and program data 936. In one embodiment, the one or more applications 932, other program modules 934, and program data 936 can include, for example, the various applications and/or components of the system 100.

A user can enter commands and information into the computer 912 through one or more wire/wireless input devices, for example, a keyboard 938 and a pointing device, such as a mouse 940. Other input devices may include microphones, infra-red (IR) remote controls, radiofrequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 902 through an input device interface 942 that is coupled to the system bus 906 but can be connected by other interfaces such as a parallel port, IEEE 1394 serial port, a game port, a USB port, an IR interface, and so forth.

A monitor 944 or other type of display device is also connected to the system bus 906 via an interface, such as a video adapter 946. The monitor 944 may be internal or external to the computer 912. In addition to the monitor 944, a computer typically includes other peripheral output devices, such as speakers, printers, and so forth.

The computer 912 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all the elements described relative to the computer 912, although, for purposes of brevity, only a memory and/or storage device 950 is illustrated. The logical connections depicted include wire/ wireless connectivity to a local area network 952 and/or larger networks, for example, a wide area network 954. Such LAN and WAN networking environments are commonplace in offices and companies, and facilitate enterprise-wide computer networks, such as intranets, all of which may connect to a global communications network, for example, the Internet.

When used in a local area network 952 networking environment, the computer 912 is connected to the local area network 952 through a wire and/or wireless communication network interface or network adapter 956. The network adapter 956 can facilitate wire and/or wireless communications to the local area network 952, which may also include a wireless access point disposed thereon for communicating with the wireless functionality of the network adapter 956.

When used in a wide area network 954 networking environment, the computer 912 can include a modem 958, or is connected to a communications server on the wide area network 954 or has other means for establishing communications over the wide area network 954, such as by way of the Internet. The modem 958, which can be internal or external and a wire and/or wireless device, connects to the system bus 906 via the input device interface 942. In a networked environment, program modules depicted relative to the computer 912, or portions thereof, can be stored in the remote memory and/or storage device 950. It will be appreciated that the network connections shown are exemplary and other means of establishing a communications link between the computers can be used.

The computer 912 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to figures herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 10:
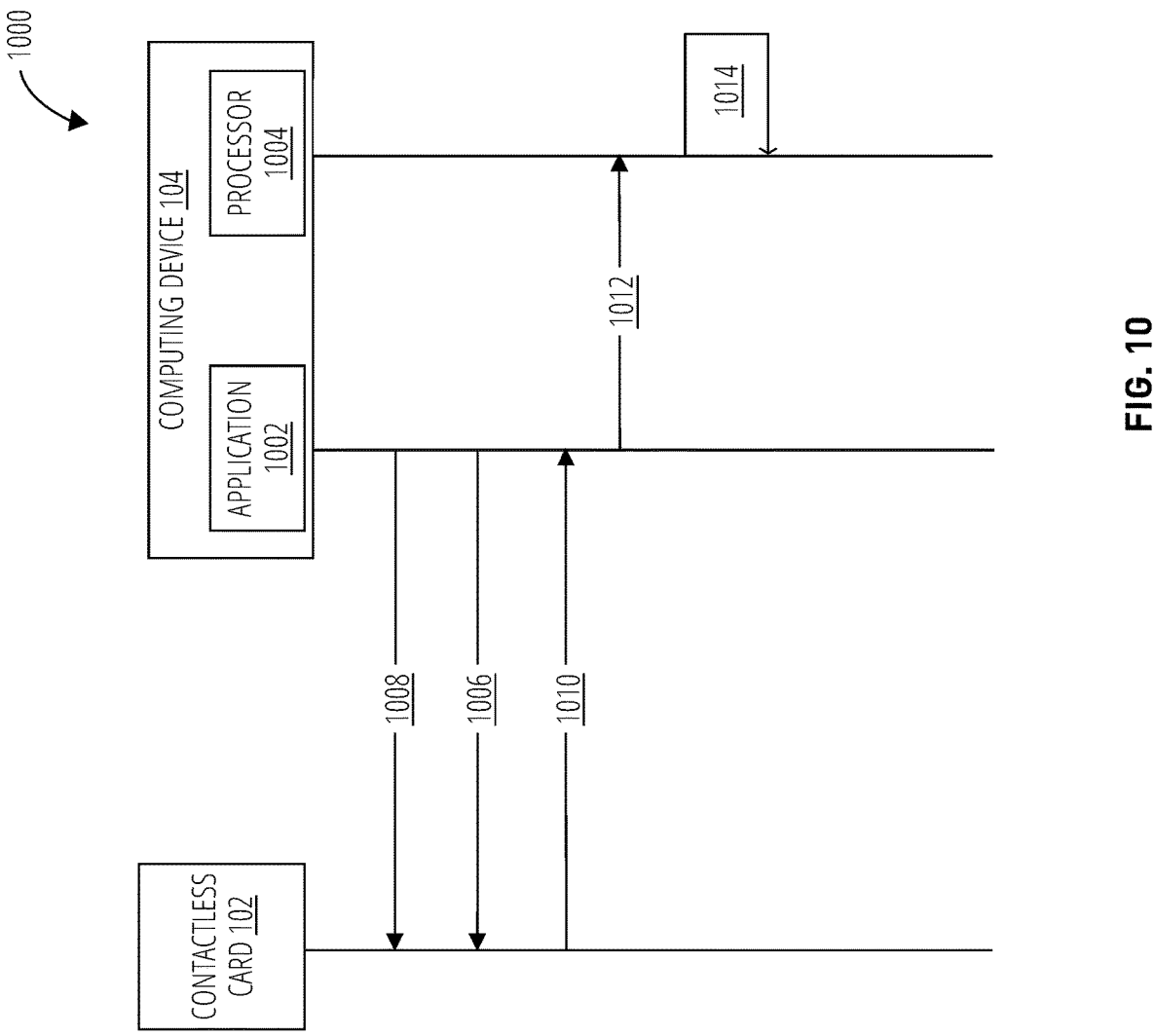
FIG. 10 illustrates a sequence flow 1000 in accordance with one embodiment.

FIG. 10 is a timing diagram illustrating an example sequence for providing authenticated access according to one or more embodiments of the present disclosure. Sequence flow 1000 may include contactless card 102 and computing device 104, which may include an application 1002 and processor 1004. The application 1002 can be any of the applications Printable document 144, 144, Printable document 144, or any other application that executes on the computing device 104.

At line 1008, the application 1002 communicates with the contactless card 102 (e.g., after being brought near the contactless card 102). Communication between the application 1002 and the contactless card 102 may involve the contactless card 102 being sufficiently close to a card reader (not shown) of the computing device 104 to enable NFC data transfer between the application 1002 and the contactless card 102.

At line 1006, after communication has been established between computing device 104 and contactless card 102, contactless card 102 generates a message authentication code (MAC) cryptogram. In some examples, this may occur when the contactless card 102 is read by the application 1002. In particular, this may occur upon a read, such as an NFC read, of a near field data exchange (NDEF) tag, which may be created in accordance with the NFC Data Exchange Format. For example, a reader application, such as application 1002, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 102 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 1002 may be configured to transmit a request to contactless card 102, the request comprising an instruction to generate a MAC cryptogram.

At line 1010, the contactless card 102 sends the MAC cryptogram to the application 1002. In some examples, the transmission of the MAC cryptogram occurs via NFC, however, the present disclosure is not limited thereto. In other examples, this communication may occur via Bluetooth, Wi-Fi, or other means of wireless data communication. At line 1012, the application 1002 communicates the MAC cryptogram to the processor 1004.

At line 1014, the processor 1004 verifies the MAC cryptogram pursuant to an instruction from the application 122. For example, the MAC cryptogram may be verified, as explained below. In some examples, verifying the MAC cryptogram may be performed by a device other than computing device 104, such as a server of a banking system in data communication with the computing device 104. For example, processor 1004 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

FIG. 11 illustrates a diagram of a system 1100 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV, and it is implemented by hardware in the contactless card. By using a key diversification process, one or more keys may be derived from a master key based upon uniquely identifiable information for each entity that requires a key.

Regarding master key management, two issuer master keys 1102, 1126 may be required for each part of the portfolio on which the one or more applets is issued. For example, the first master key 1102 may comprise an Issuer Cryptogram Generation/Authentication Key (Iss-Key-Auth) and the second master key 1126 may comprise an Issuer Data Encryption Key (Iss-Key-DEK). As further explained herein, two issuer master keys 1102, 1126 are diversified into card master keys 1108, 1120, which are unique for each card. In some examples, a network profile record ID (pNPR) 522 and derivation key index (pDKI) 1124, as back-office data, may be used to identify which Issuer Master Keys 1102, 1126 to use in the cryptographic processes for authentication. The system performing the authentication may be configured to retrieve values of pNPR 1122 and pDKI 1124 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 1108 and Card-Key-Dek 1120). The session keys (Aut-Session-Key 1130 and DEK-Session-Key 1110) may be generated by the one or more applets and derived by using the application transaction counter (pATC) 1104 with one or more algorithms. To fit data into the one or more algorithms, only the 2 low order bytes of the 4-byte pATC 1104 is used. In some examples, the four byte session key derivation method may comprise: F1:=PATC (lower 2 bytes)‖'F0'‖'00'‖PATC (four bytes) F1:=PATC (lower 2 bytes)‖'0F'‖'00'‖PATC (four bytes) SK:={(ALG (MK) [F1])‖ALG (MK) [F2]}, where ALG may include 3DES ECB and MK may include the card unique derived master key.

As described herein, one or more MAC session keys may be derived using the lower two bytes of pATC 1104 counter. At each tap of the contactless card, pATC 1104 is configured to be updated, and the card master keys Card-Key-AUTH 508 and Card-Key-DEK 1120 are further diversified into the session keys Aut-Session-Key 1130 and DEK-Session-KEY 1110. pATC 1104 may be initialized to zero at personalization or applet initialization time. In some examples, the pATC 1104 counter may be initialized at or before personalization and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 1130. The data specified in cryptogram may be processed with javacard.signature method: ALG_DES_MAC_ISO9797_1_M2_ALG3 to correlate to EMV ARQC verification methods. The key used for this computation may comprise a session key AUT-Session-Key 1130, as explained above. As explained above, the low order two bytes of the counter may be used to diversify for the one or more MAC session keys. As explained below, AUT-Session-Key 1130 may be used to MAC data 1106, and the resulting data or cryptogram An 1114 and random number RND may be encrypted using DEK-Session-Key 1110 to create cryptogram B or output 1118 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 1110 derived from the Card-Key-DEK 1120. In this case, the ATC value for the session key derivation is the least significant byte of the counter pATC 1104.

The format below represents a binary version example embodiment. Further, in some examples, the first byte may be set to ASCII 'A.'

Message Format

| 1 | 2 | 4 | 8 | 8 |
|---|---|---|---|---|
| 0x43 (Message Type 'A') | Version | pATC | RND | Cryptogram A (MAC) |

| Cryptogram A (MAC) | 8 bytes | | | |
|---|---|---|---|---|

| MAC of | | | | |
|---|---|---|---|---|
| 2 | 8 | 4 | 4 | 18 bytes input data |
| Version | pUID | pATC | Shared Secret | |

Message Format

| 1 | 2 | 4 | 16 |
|---|---|---|---|
| 0x43 (Message Type 'A') | Version | pATC | Cryptogram B |

| Cryptogram A (MAC) | 8 bytes | | | |
|---|---|---|---|---|

| MAC of | | | | |
|---|---|---|---|---|
| 2 | 8 | 4 | 4 | 18 bytes input data |
| Version | pUID | pATC | Shared Secret | |

| Cryptogram B | 16 |
|---|---|

| Sym Encryption of | |
|---|---|
| 8 | 8 |
| RND | Cryptogram A |

Another exemplary format is shown below. In this example, the tag may be encoded in hexadecimal format.

| Message Format | | | | |
| --- | --- | --- | --- | --- |
| 2 Version | 8 pUID | 4 pATC | 8 RND | 8 Cryptogram A (MAC) |

| 8 bytes | | | | |
| --- | --- | --- | --- | --- |
| 8 pUID | 8 pUID | 4 pATC | 4 Shared Secret | 18 bytes input data |

| Message Format | | | |
| --- | --- | --- | --- |
| 2 Version | 8 pUID | 4 pATC | 16 Cryptogram B |

| 8 bytes | | | | |
| --- | --- | --- | --- | --- |
| 8 pUID | 8 pUID | 4 pATC | 4 Shared Secret | 18 bytes input data |

| Cryptogram B | 16 |
| --- | --- |

| Sym Encryption of 8 RND | 8 Cryptogram A |
| --- | --- |

The UID field of the received message may be extracted to derive, from master keys Iss-Key-AUTH 905 and Iss-Key-DEK 910, the card master keys (Card-Key-Auth 925 and Card-Key-DEK 930) for that particular card. Using the card master keys (Card-Key-Auth 508 and Card-Key-DEK 1120), the counter (pATC) field of the received message may be used to derive the session keys (Aut-Session-Key 1130 and DEK-Session-Key 1110) for that particular card. Cryptogram B 1118 may be decrypted using the DEK-Session-KEY, which yields cryptogram An 1114 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC.' If MAC' is the same as cryptogram An 1114, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 1130. The input data 1106 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 1112, data 1106 is processed through the MAC using Aut-Session-Key 1130 to produce MAC output (cryptogram A) 1114, which is encrypted.

In order to provide additional protection against brute force attacks exposing the keys on the card, it is desirable that the MAC cryptogram 1114 be enciphered. In some examples, data or cryptogram An 1114 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 1110. In the encryption operation 1116, data or cryptogram An 1114 and RND are processed using DEK-Session-Key 510 to produce encrypted data, cryptogram B 1118. The data 1114 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

FIG. 12 illustrates a method 1200 for generating a cryptogram. For example, at block 1202, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 1204, Issuer Master Keys may be diversified by combining them with the card's unique ID number (pUID) and the PAN sequence number (PSN) of one or more applets, for example, a payment applet.

At block 1206, Card-Key-Auth and Card-Key-DEK (unique card keys) may be created by diversifying the Issuer Master Keys to generate session keys which may be used to generate a MAC cryptogram.

At block 1208, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 13:
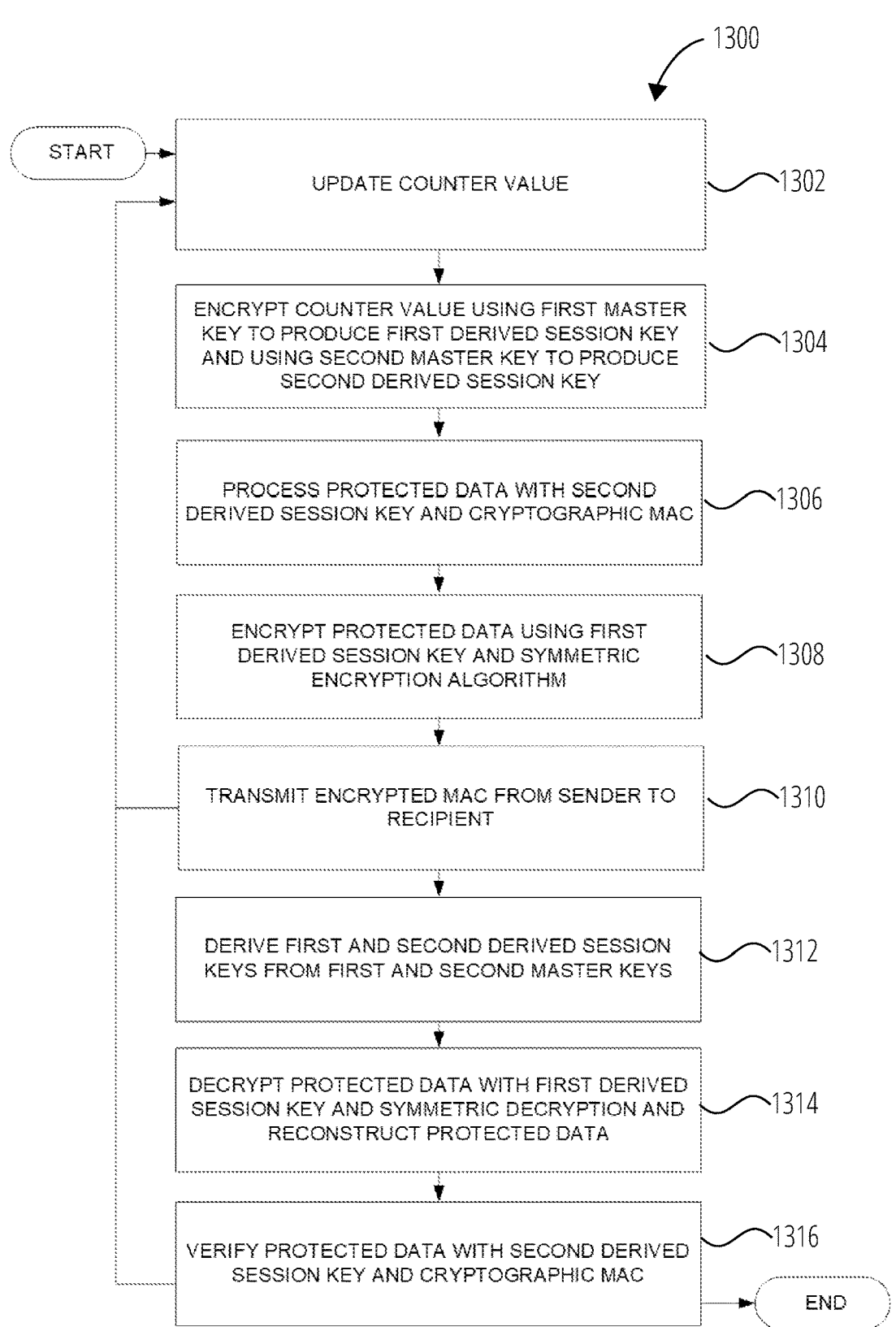
FIG. 13 illustrates an aspect of the subject matter in accordance with one embodiment.

FIG. 13 depicts an exemplary process 1300 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1302, and other data, such as data to be protected, which it may secure share with the recipient.

At block 1304, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1306, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1308, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1310, the encrypted MAC is transmitted, from the sender to the recipient, with sufficient information to identify additional secret information (such as shared secret, master keys, etc.), for verification of the cryptogram.

At block 1312, the recipient uses the received counter value to independently derive the two derived session keys from the two master keys as explained above.

At block 1314, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1316, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1302) and a new set of session keys may be created (at block 1310). In some examples, the combined random data may be discarded.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method to enable self-service printing with authentication, the computer-implemented method comprising:
   receiving, by a server, a print-request to print a document associated with an account, the print-request received from a computing device, wherein the print-request comprises a first cryptogram generated by a contactless card;
   authenticating the print-request based on the first cryptogram, wherein authenticating the print-request by the computing device comprises a first authentication routine, wherein the first authentication routine is based on the contactless card, the first cryptogram generated by encoding, with a first session key, a first message;
   adding, by the server after authentication of the first cryptogram, a print job for the document in a print queue associated with the account;
   receiving, by the server, a second request to initiate printing the document associated with the account, the second request received from a printer;
   instructing, by the server, the printer to perform an authentication process;
   receiving, from the printer, a second cryptogram generated by the contactless card to authenticate the second request, wherein the first cryptogram is different from the second cryptogram;
   authenticating the second request based on the second cryptogram, wherein authenticating the second request by the printer comprises a second authentication routine; and
   releasing, by the server, the print queue associated with the account to cause the printer to print the document, the releasing being responsive to the second request being authenticated.

2. The computer-implemented method of claim 1, wherein the first authentication routine is based on a setting stored in the computing device.

3. The computer-implemented method of claim 1, the first cryptogram generated by encoding, with a first session key, the first message combined with one or more blocks of random data.

4. The computer-implemented method of claim 1, wherein the second authentication routine is based on the contactless card and the computing device, the second cryptogram generated by encoding, with a second session key, a second message combined with one or more blocks of random data.

5. The computer-implemented method of claim 1, wherein the second authentication routine is based on the contactless card.

6. The computer-implemented method of claim 1, further comprising, in response to receiving the print-request to print the document, suggesting, by the server, one or more printers to print the document.

7. The computer-implemented method of claim 6, wherein the one or more printers are suggested based on a type of the document.

8. The computer-implemented method of claim 1, wherein releasing the print queue comprises verifying, by the server, that the printer is authorized to print the document based on a type of the document.

9. A computer-implemented method to enable self-service printing with authentication, the computer-implemented method comprising:

performing an authentication procedure, wherein the authentication procedure comprises requesting that a contactless card be located in proximity to a computing device;

receiving, from the contactless card, a first cryptogram, the first cryptogram generated by encoding, with a first session key, a first message combined with one or more blocks of random data;

communicating the first cryptogram to a server for authentication;

after authentication of the first cryptogram, receiving, by the computing device, for printing, a selection of a document associated with an account;

generating, by the computing device, a list of printers for printing the document, the list is generated based on a type of the document;

selecting, by the computing device, from the list, a printer to print the document;

receiving, by the computing device, an instruction to perform an authentication procedure with the contactless card;

outputting, by the computing device, a prompt to present the contactless card;

receiving a second cryptogram from the contactless card, the second cryptogram generated by encoding, with a second session key, a second message combined with one or more blocks of random data, the second cryptogram different from the first cryptogram;

sending the second cryptogram from the contactless card to the server;

receiving an authentication code from the server based on authentication of the second cryptogram; and providing, by the computing device, in response to the printer being accessed to print the document, an authentication code that causes the printer to print the document.

10. The computer-implemented method of claim 9, wherein the list is generated further based on a location of the computing device.

11. The computer-implemented method of claim 9, wherein the document is a plurality of documents, and the list of printers is generated based on the type of a first document from the plurality of documents.

12. The computer-implemented method of claim 9, wherein the type of the document is at least one of a report, an account statement, a transaction history, a check, a money transfer instruction, a form, a letter, an offer, and a combination thereof.

13. The computer-implemented method of claim 9, wherein, the authentication code is provided as a machine-readable code to be scanned by the printer.

14. The computer-implemented method of claim 9, wherein the authentication code is received by the computing device from the server in response to a contactless card-based authentication by the computing device.

15. A computing apparatus comprising:

a processor; and a memory storing instructions that, when executed by the processor, configure the computing apparatus to:

receive a first request to print a document associated with an account, the first request received from a computing device, wherein the first request comprises a first cryptogram generated by a contactless card;

authenticating the first request based on the first cryptogram;

add a print job for the document in a print queue associated with the account after authenticating the first request;

receive a second request to initiate printing the document, the second request received from a printer;

instruct, by the computing apparatus, the printer to perform an authentication process;

receive, from the printer, a second cryptogram generated by the contactless card to authenticate the second request, wherein the first cryptogram is different from the second cryptogram;

authenticating the second request based on the second cryptogram, wherein the second request is authenticated using the contactless card and the computing device, wherein the computing apparatus provides an authentication code to the computing device after authentication of the second cryptogram and communication of the authentication code to the printer causes the printer to print the document; and release the print queue associated with the account to cause the printer to print the document, the release being responsive to the second request being authenticated.

16. The computing apparatus of claim 15, wherein the computing device authenticates the first request using a first authentication routine, and the printer authenticates the second request using a second authentication routine.

17. The computing apparatus of claim 16, wherein the first authentication routine is based on a setting stored in the computing device.

18. The computing apparatus of claim 15, wherein the computing apparatus releases the print queue after receipt of the authentication code from the printer.

19. The computing apparatus of claim 15, wherein the print queue is released in response to verification that the printer is authorized to print the document.

20. The computing apparatus of claim 15, the computing apparatus to further, in response to receiving the first request to print the document, suggest one or more printers to print the document, wherein the one or more printers are suggested based on a type of the document.

* * * * *